United States Patent
Ishihara

(10) Patent No.: US 9,217,679 B2
(45) Date of Patent: Dec. 22, 2015

(54) FOREIGN MATTER DETECTION SENSOR

(71) Applicant: ASMO CO., LTD., Shizuoka-ken (JP)

(72) Inventor: Hidenori Ishihara, Hamamatsu (JP)

(73) Assignee: Asmo Co. Ltd., Shizuoka-Ken (JP)

( * ) Notice: Subject to any disclaimer, the term of this patent is extended or adjusted under 35 U.S.C. 154(b) by 359 days.

(21) Appl. No.: 13/854,654

(22) Filed: Apr. 1, 2013

(65) Prior Publication Data

US 2013/0333488 A1   Dec. 19, 2013

(30) Foreign Application Priority Data

Apr. 3, 2012 (JP) .................................. 2012-084994
Jan. 23, 2013 (JP) .................................. 2013-010429
Feb. 7, 2013 (JP) .................................. 2013-022524

(51) Int. Cl.
  *G01L 1/04* (2006.01)
  *H01H 3/14* (2006.01)
  *E05F 15/44* (2015.01)

(52) U.S. Cl.
  CPC . *G01L 1/04* (2013.01); *E05F 15/44* (2015.01); *H01H 3/142* (2013.01)

(58) Field of Classification Search
  CPC ............ G01L 1/04; H01H 3/142; E05F 15/44
  USPC ..................................... 73/862.621; 49/26, 27
  See application file for complete search history.

(56) References Cited

U.S. PATENT DOCUMENTS

| 6,339,305 | B1 | 1/2002 | Ishihara et al. |
| 7,504,943 | B2 | 3/2009 | Takeuchi et al. |
| 8,191,427 | B2 * | 6/2012 | Hattori et al. |

FOREIGN PATENT DOCUMENTS

| JP | 11-283459 A | 10/1999 |
| JP | 11-191337 A | 6/2002 |
| JP | 2007-055590 A | 3/2007 |
| JP | 2007-176322 A | 7/2007 |

* cited by examiner

*Primary Examiner* — Hezron E Williams
*Assistant Examiner* — David Z Huang
(74) *Attorney, Agent, or Firm* — Christensen Fonder PA

(57) ABSTRACT

A foreign matter detection sensor includes a sensor section, power supply members, a sealing member, and includes an elastic elongated hollow insulating body with separated electrode wires inside the insulating body. The sensor section includes a first end and a second end and detects foreign matter by receiving external force from the foreign matter and being elastically deformed. The power supply members are electrically connected to the electrode wires at the second end of the sensor section via electrode connecting portions. Each power supply member includes a direction changing section, extending from an associated electrode connecting portion in a direction intersecting the longitudinal direction of the sensor section and further extends in a direction toward the first end of the sensor section. The sealing member on the second end of the sensor section seals the electrode connecting portions, the direction changing sections, and one end of the hollow body.

9 Claims, 10 Drawing Sheets

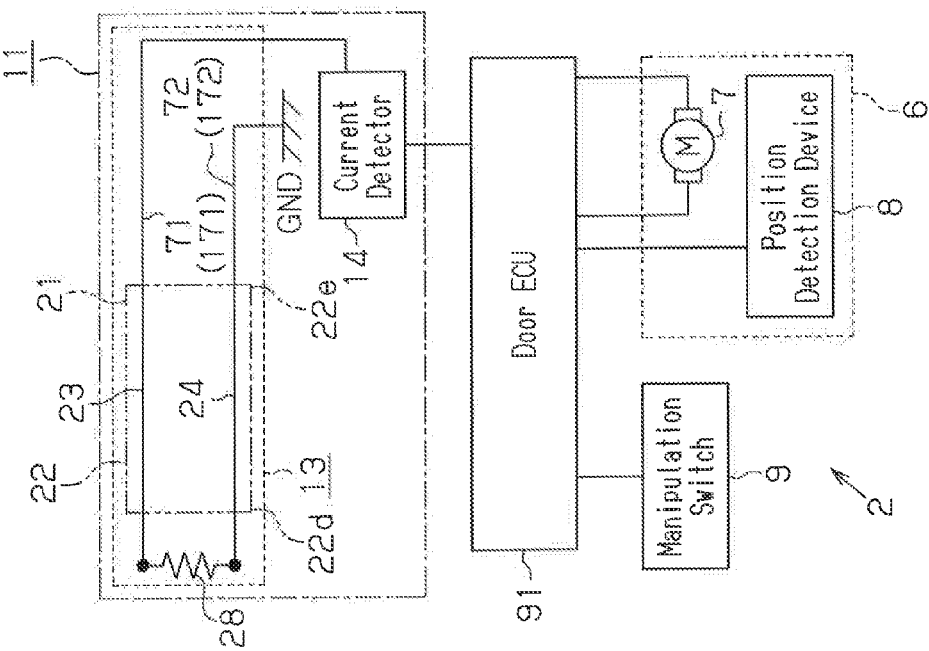
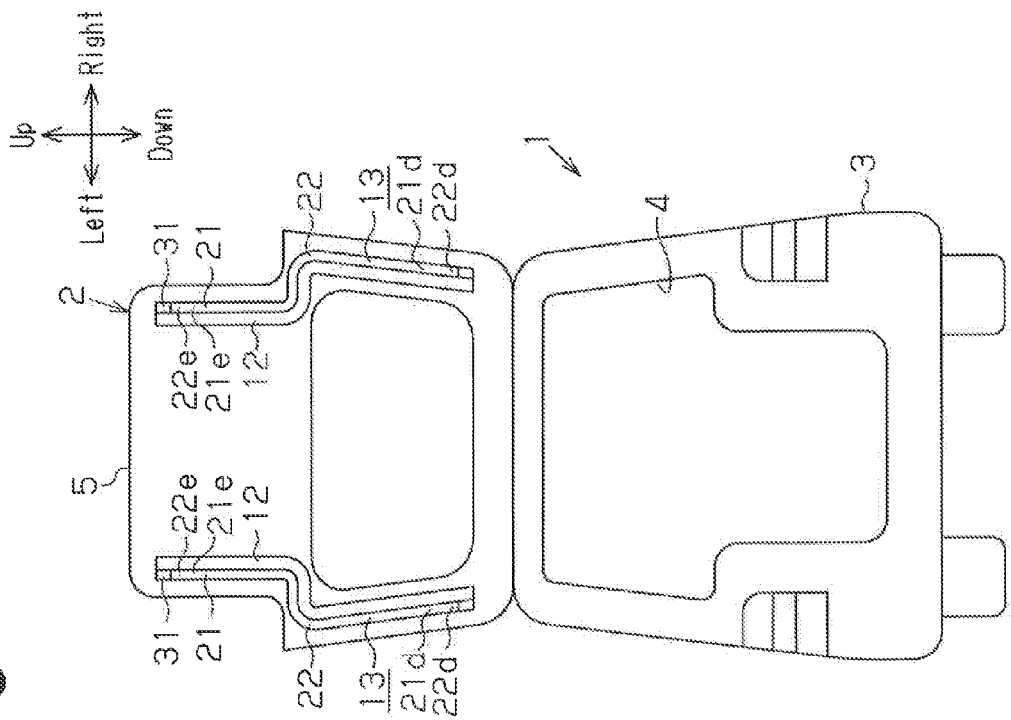

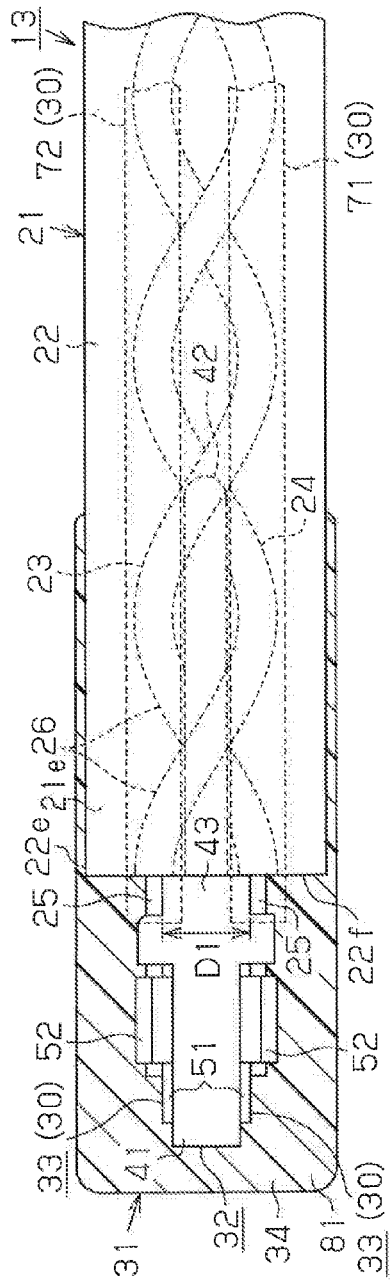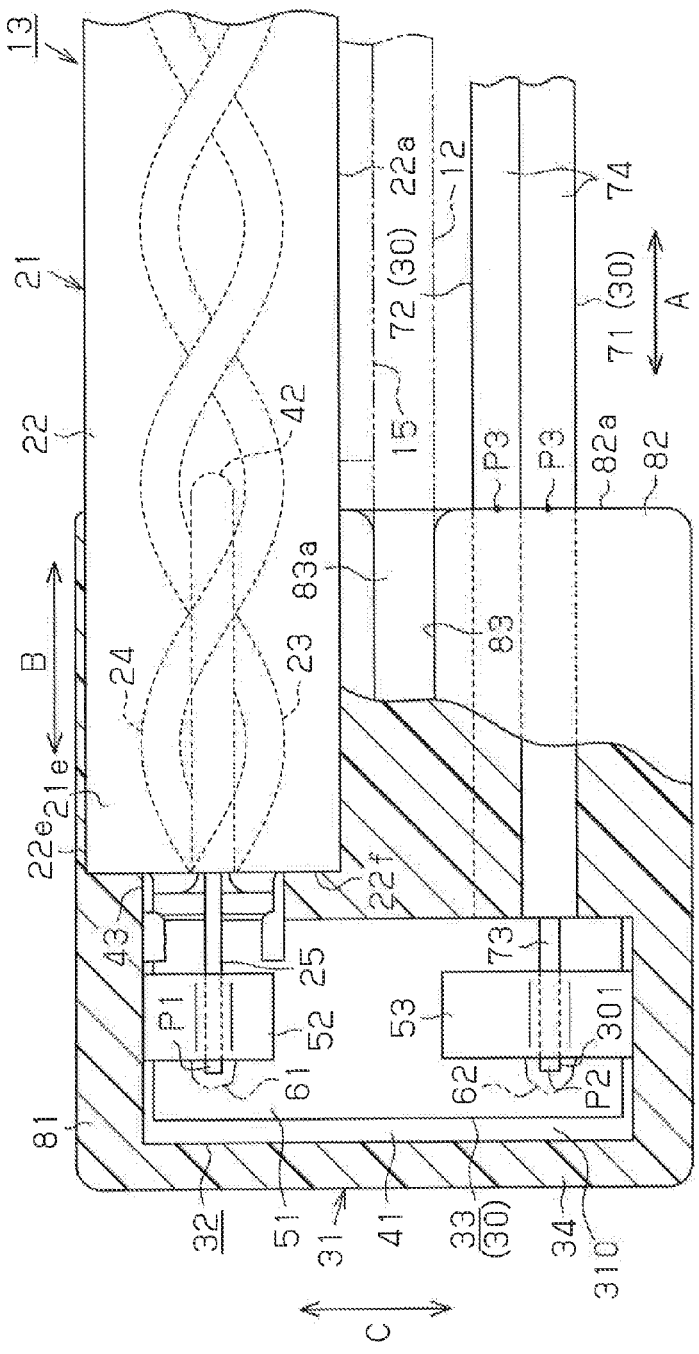
Fig.5A
Fig.5B

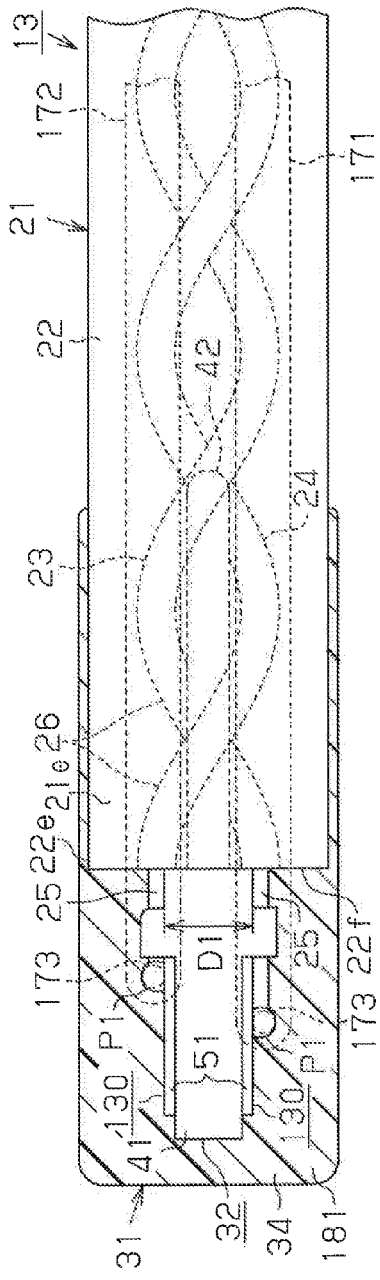
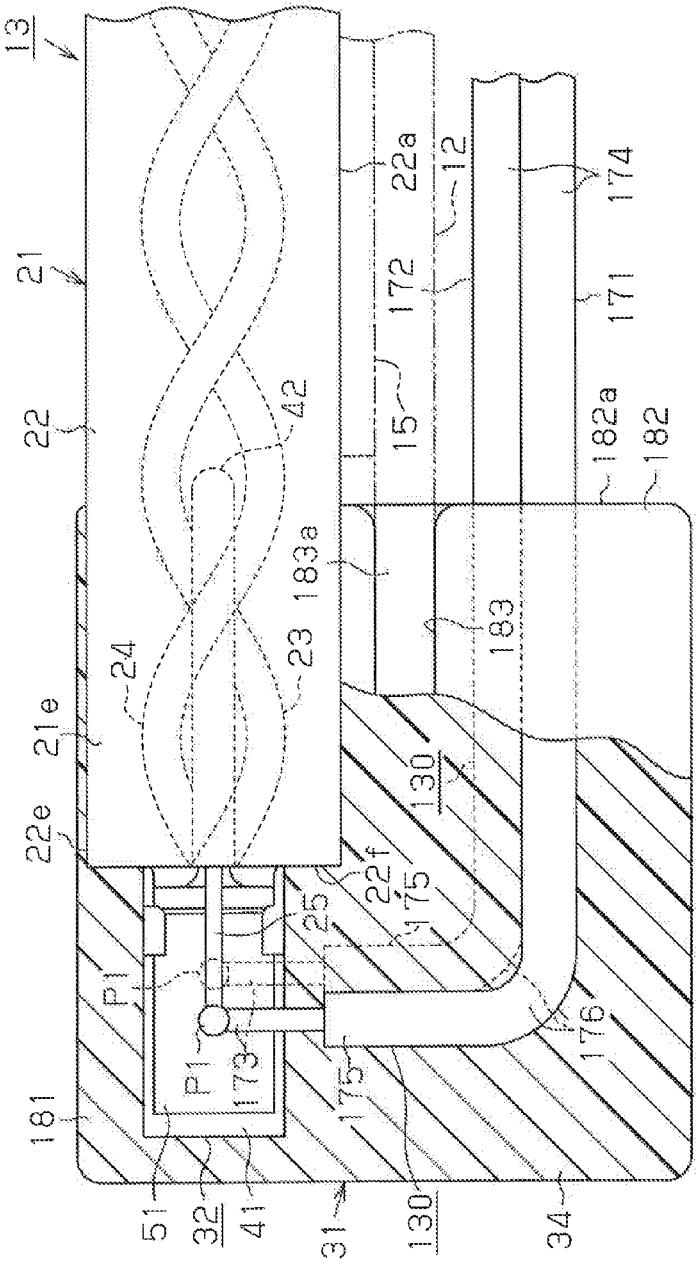
Fig.7A
Fig.7B

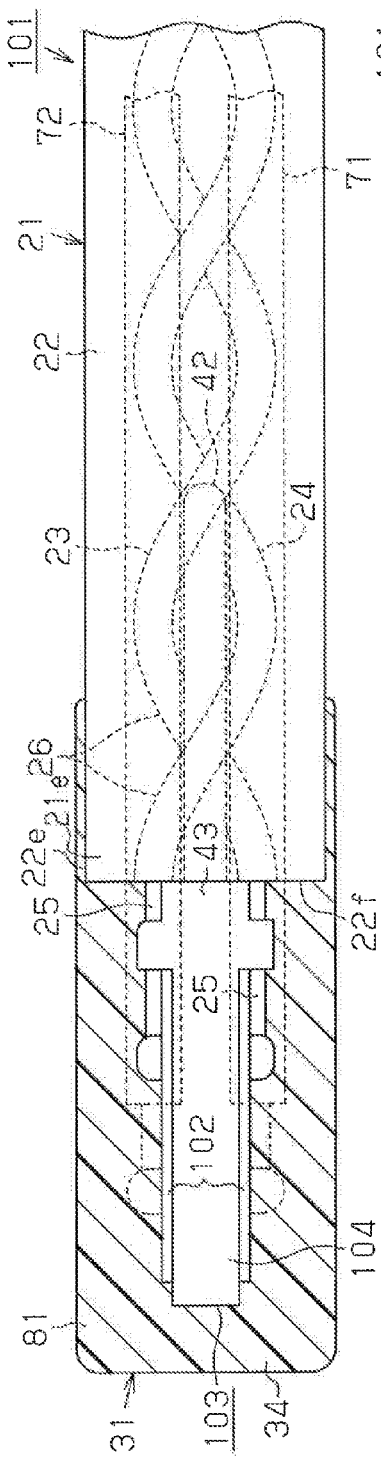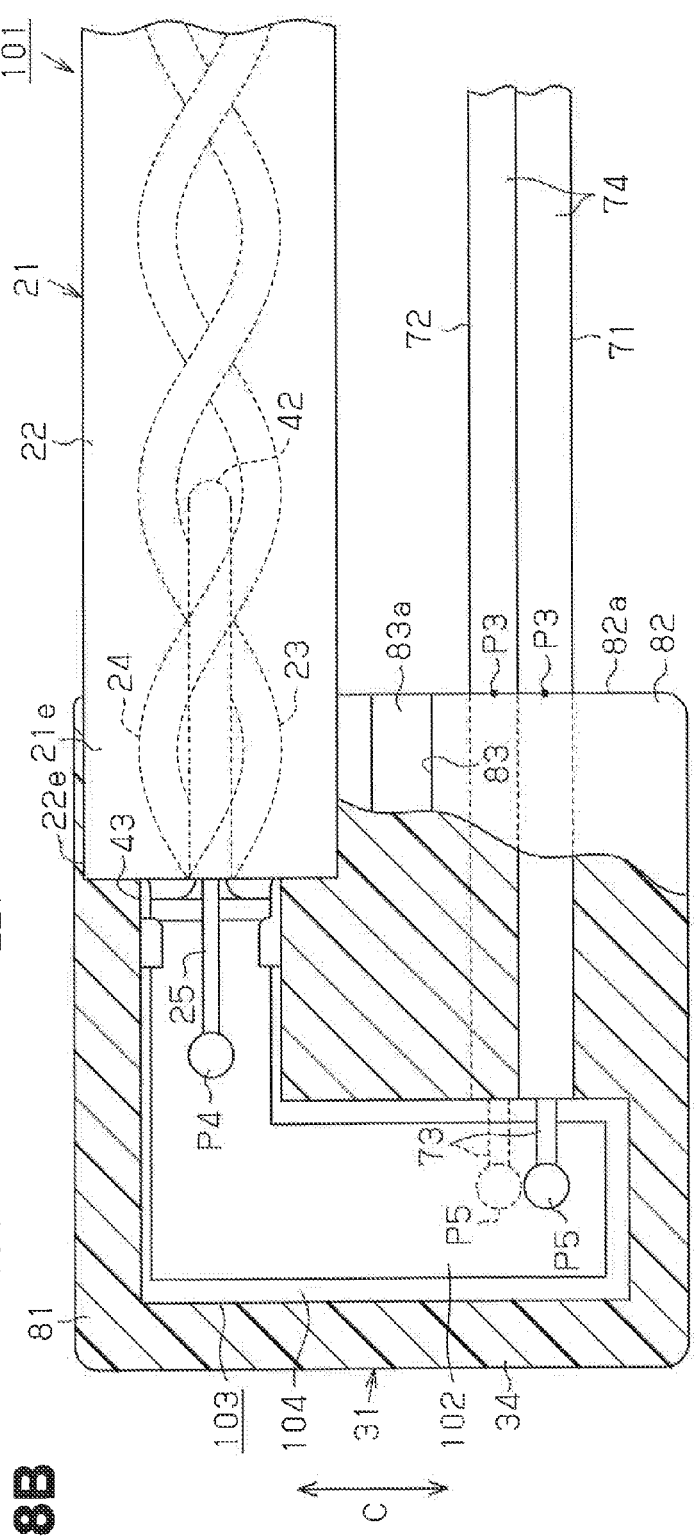
Fig.8A
Fig.8B

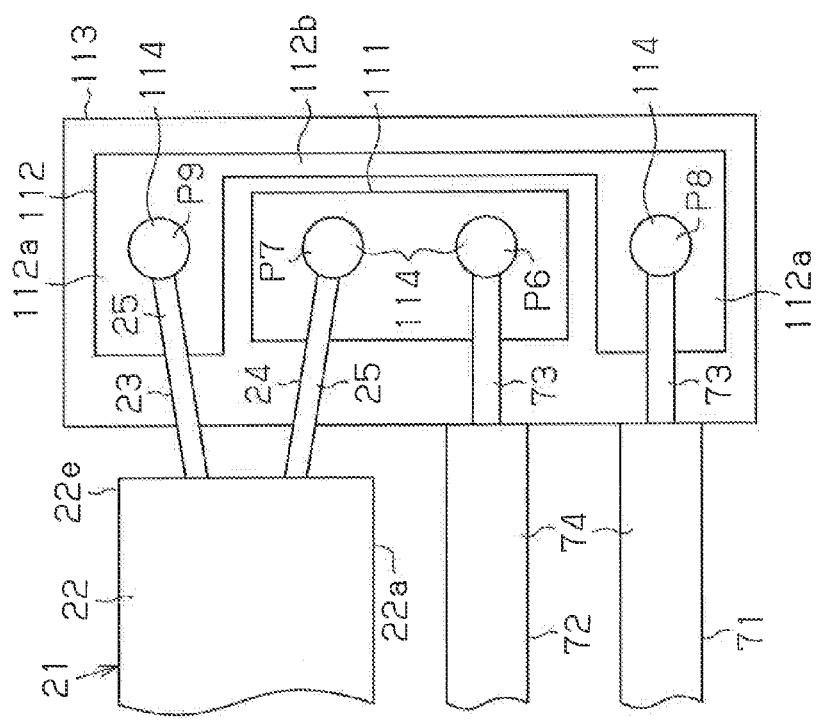
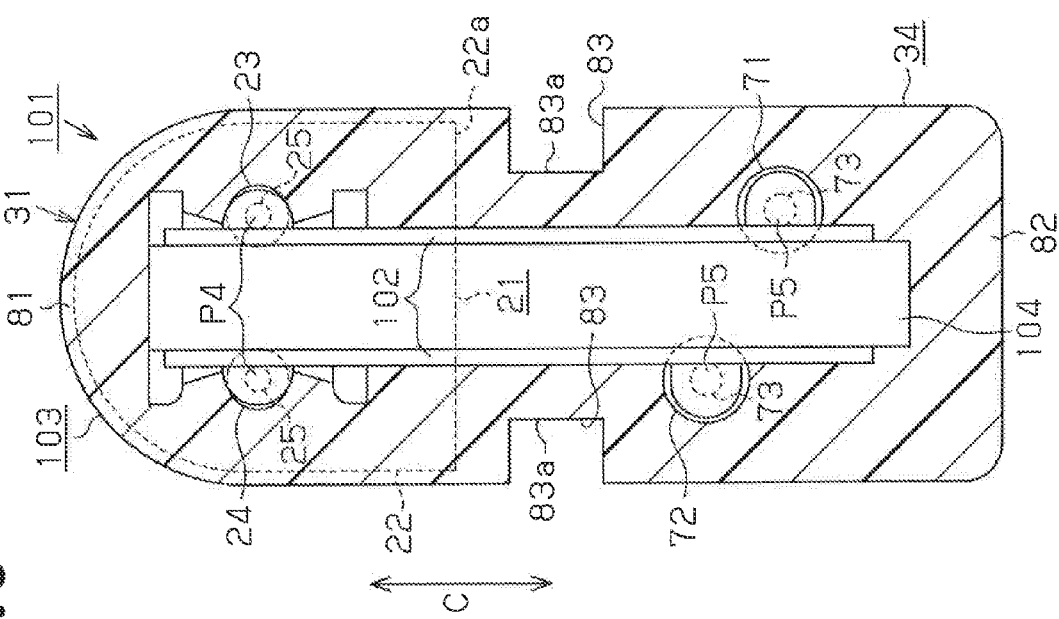

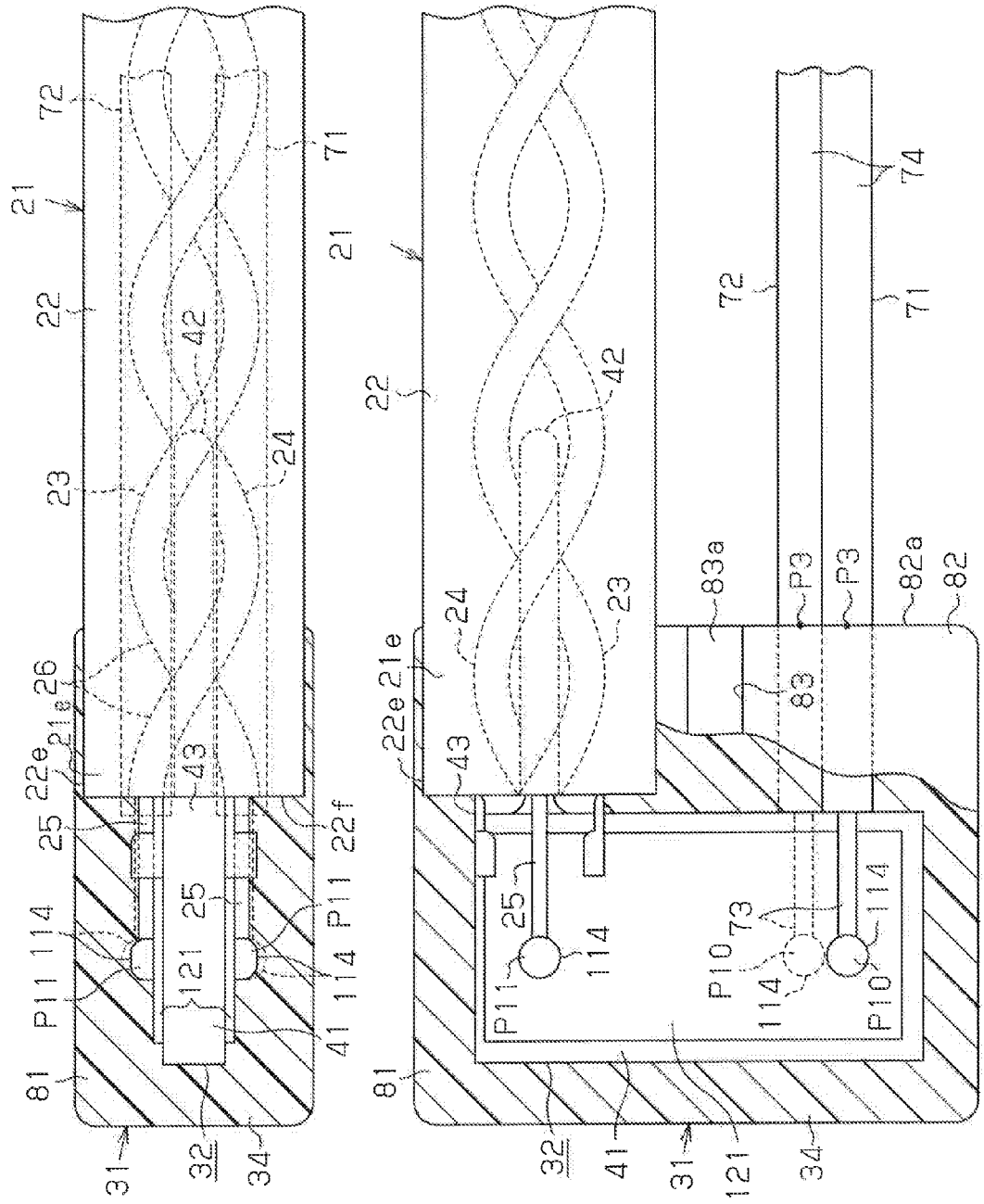

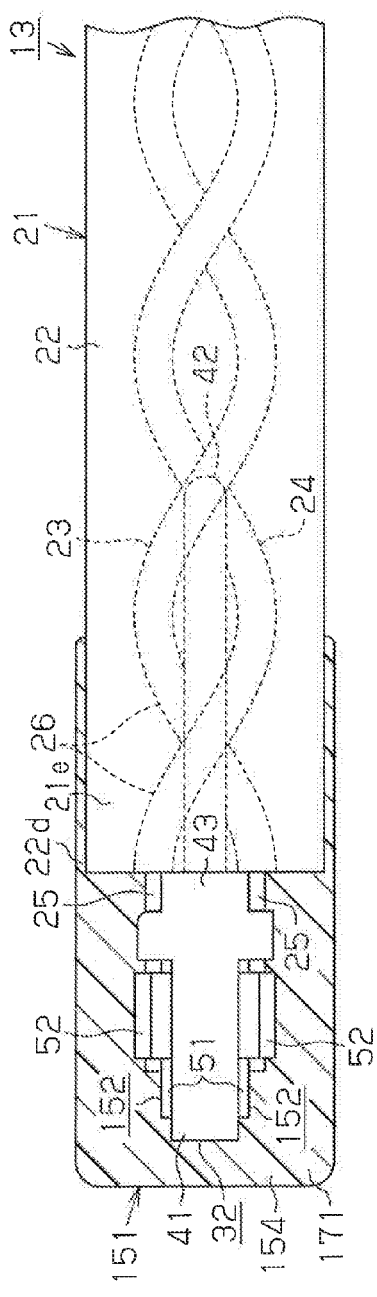
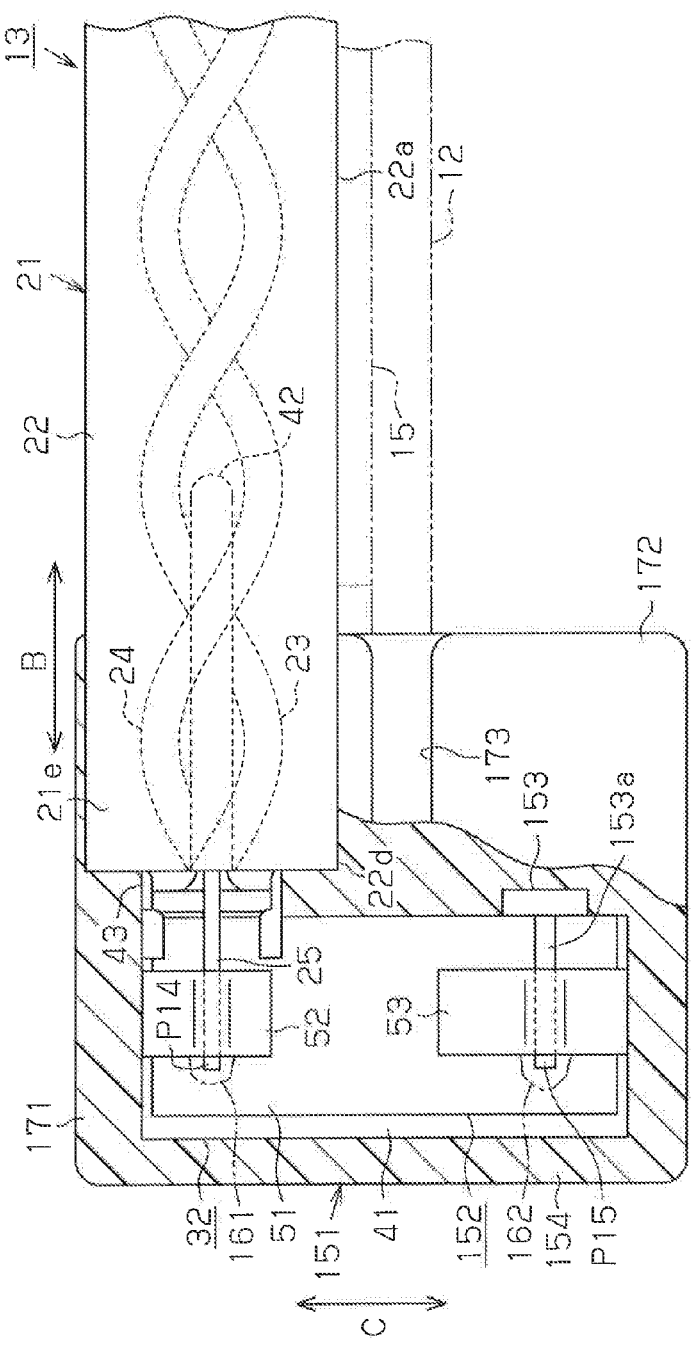
Fig. 13A
Fig. 13B

FOREIGN MATTER DETECTION SENSOR

TECHNICAL FIELD

The present invention relates to a foreign matter detection sensor.

BACKGROUND ART

An electric door opening and closing apparatus has been proposed that selectively opens and closes an opening portion (such as a door opening and a tail opening) formed in a vehicle body by moving a door panel through driving force of for example, a motor. In such an opening and closing apparatus, to prevent foreign matter from being caught between the edge of the opening portion and the door panel, a foreign matter detection sensor as disclosed in, for example, Japanese Laid-Open Patent Publication No, 2007-176322 has been proposed for detecting foreign matter located between the edge of the opening portion and the door panel.

The foreign matter detection sensor disclosed in the above-mentioned patent document includes an elongated sensor section that elastically deforms when contacting foreign matter. The sensor section, is mounted on the end portion of the door panel to extend in the vertical direction. A lead wire for supplying current to the sensor section is connected to the lower end of the sensor section. The lead wire extends from the lower end of the sensor section in the longitudinal direction of the sensor section. After being folded back upward at the lower end of the sensor section, the lead wire is drawn into the door panel. That is, after extending downward from the lower end of the sensor section in the longitudinal direction of the sensor section, the lead wire is folded back upward in a substantially U-shape and is drawn into the door panel. According to the above-mentioned foreign matter detection sensor, the foreign matter is detected by the sensor section that elastically deforms by the foreign matter that contacts the sensor section.

The above-mentioned foreign matter detection sensor is arranged such that not only the sensor section but also the lead wire folded back in a substantially U-shape at the lower end of the sensor section is arranged at the end portion of the door panel within a vertical range of the door panel. Therefore, the range in which the sensor section is arranged becomes narrow in the longitudinal direction of the sensor section by the amount corresponding to the lead wire that is folded back in a substantially U-shape at the lower end of the sensor section. As a result, the length of the sensor section is reduced. Since the foreign matter detection sensor is for detecting foreign matter that contacts the sensor section, if the length of the sensor section is reduced, the range in which the foreign matter is detected is undesirably reduced in the longitudinal direction of the sensor section.

Accordingly, it is an objective of the present invention to provide a foreign matter detection sensor that has an increased detection range in the longitudinal direction of the sensor section.

Means for Solving the Problems

To achieve the foregoing objective and in accordance with one aspect of the present invention, a foreign matter detection sensor is provided that includes an elongated sensor section, power supply members, and sealing member. The elongated sensor section includes an elongated elastic hollow insulating body and a plurality of electrode wires arranged inside the hollow insulating body to be separate from each other. The sensor section includes a first end and a second end in a longitudinal direction, and the sensor section detects foreign matter by receiving external force from the foreign matter and being elastically deformed. The power supply members are electrically connected to the electrode wires drawn out from the hollow insulating body at the second end of the sensor section via electrode connecting portions. Each power supply member includes a direction changing section, which extends from the associated electrode connecting portion in a direction intersecting the longitudinal direction of the sensor section and further extends in a direction toward the first end of the sensor section. The sealing member is provided on the second end of the sensor section, wherein the sealing member incorporates and seals the electrode connecting portions, the direction changing sections, and one longitudinal end of the hollow insulating body corresponding to the second end of the sensor section.

Effects of the Invention

The foreign matter detection sensor of the present invention increases the detection range in the longitudinal direction of the sensor section.

BRIEF DESCRIPTION OF THE DRAWINGS

FIG. 1 is a schematic view illustrating a vehicle on which a foreign matter detection apparatus is mounted;

FIG. 2 is a block diagram illustrating an electrical configuration of a motor-driven back door device;

FIG. 5(a) is a partial cross-sectional view illustrating the foreign matter detection sensor;

FIG. 5(b) is a partial cross-sectional view illustrating the foreign matter detection sensor;

FIG. 7(a) is a partial cross-sectional view illustrating the foreign matter detection sensor;

FIG. 7(b) is a partial cross-sectional view illustrating the foreign matter detection sensor;

FIG. 8(a) is a partial cross-sectional view illustrating a foreign matter detection sensor according to another embodiment;

FIG. 8(b) is a partial cross-sectional view illustrating a foreign matter detection sensor according to another embodiment;

FIG. 9 is a cross-sectional view illustrating a foreign matter detection sensor according to another embodiment;

FIG. 10 is a schematic view illustrating the vicinity of terminals of the foreign matter detection sensor according to another embodiment;

FIG. 12(a) is a partial cross-sectional view illustrating a foreign matter detection sensor according to another embodiment;

FIG. 12(b) is a partial cross-sectional view illustrating a foreign matter detection sensor according to another embodiment;

FIG. 13(a) is a partial cross-sectional view illustrating a foreign matter detection sensor according to another embodiment; and FIG. 13(b) is a partial cross-sectional view illustrating a foreign matter detection sensor according to another embodiment.

MODES FOR CARRYING OUT THE INVENTION

First Embodiment

Figure 3:
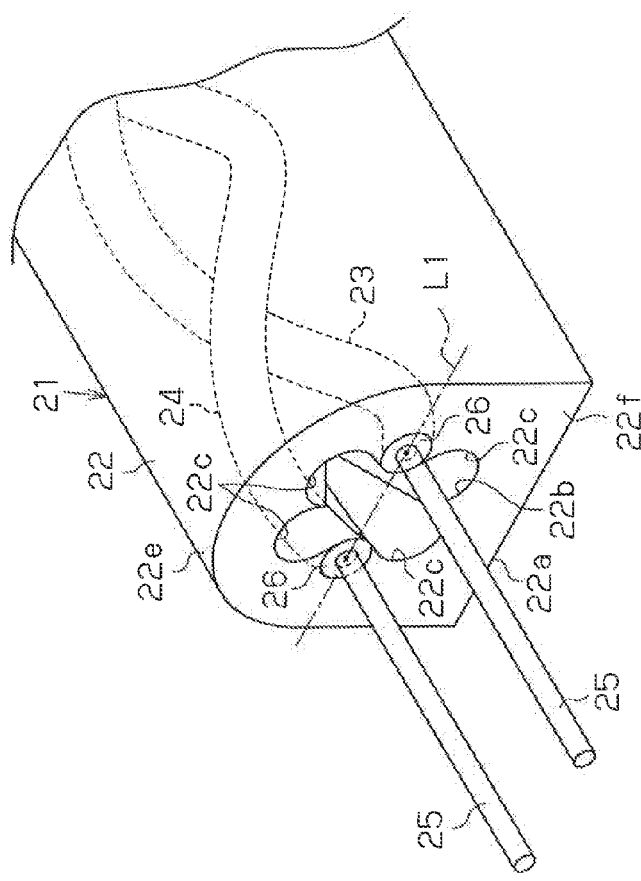
FIG. 3 is a perspective view illustrating a sensor section of a foreign matter detection sensor according to a first embodiment of the present invention.

A foreign matter detection sensor according to a first embodiment of the present invention will now be described.

As shown in FIG. 1, a vehicle 1 includes a motor-driven back door device 2. At the rear part of a vehicle body 3 constituting the vehicle 1, a tail opening 4 is formed. The tail opening 4 is selectively opened and closed by a door panel 5, which has a shape corresponding to the tail opening 4. The upper end of the door panel 5 is rotationally coupled to the upper end of the rear side surface of the vehicle body 3. Thus, the door panel 5 is rotational in the vertical direction about the coupling portion between the door panel 5 and the vehicle body 3, and is moved between a fully closed position and a fully opened position. The fully closed position is a position at which the door panel 5 fully closes the tail opening 4, and the fully opened position is a position at which the door panel 5 fully opens the tail opening 4.

A drive mechanism (not shown) is connected to the door panel 5. The drive mechanism is located on the vehicle body 3 and includes an actuator 6 shown in FIG. 2. According to the motor-driven back door device 2, when the actuator 6 is driven, the door panel 5 is rotated in the vertical direction to selectively open and close the tail opening 4.

As shown in FIG. 2, the actuator 6 includes a motor 7, and a speed reduction mechanism (not shown), which decelerates and outputs the rotation of the motor 7. A position detection device 8, which detects rotation of the motor 7, is located in the actuator 6. The position detection device 8 includes a magnet, which is provided, to rotate integrally with a rotary shaft of the motor 7 or a speed reducing gear of the speed reduction mechanism, and a hall IC, which is located opposite to the magnet. The hall IC outputs, as position detection signals, pulse signals corresponding to changes of the magnetic field of the magnet caused by rotation of the magnet.

The motor-driven back door device 2 includes a manipulation switch 9 for giving directions to selectively open and close the door panel 5. As shown in FIGS. 1 and 2, when the manipulation switch 9 is manipulated by, for example, an occupant of the vehicle 1 to open the tail opening 4, the manipulation switch 9 outputs an opening signal for rotating the door panel 5 to open the tail opening 4. When the manipulation switch 9 is manipulated by, for example, the occupant to close the tail opening 4, the manipulation switch 9 outputs a closing signal for rotating the door panel 5 to close the tail opening 4. The manipulation switch 9 is provided on, for example, a predetermined position in the passenger compartment such as a dashboard, a door lever (not shown) of the door panel 5, and a carrying item carried with an ignition key.

The motor-driven back door device 2 includes a foreign matter detection apparatus 11 for detecting foreign matter located between the edge of the door panel 5 and the edge of the tail opening 4 opposing the edge of the door panel 5. The foreign matter detection apparatus 11 includes foreign matter detection sensors 13, which are mounted on the edges of the door panel 5 via brackets 12, and a current detector 14, which is electrically connected to the foreign matter detection sensors 13.

As shown in FIG. 1, the brackets 12 are secured to the edges of the door panel 5 opposing the edges of the tail opening 4. More specifically, the brackets 12 are secured to both ends of the inner surface of the door panel 5 (that is, the side of the door panel 5 facing the vehicle compartment) in the left and right direction. The brackets 12 have a substantially band-like shape and extend vertically along the left and right ends of the door panel 5.

The foreign matter detection sensors 13 are long strings. Each foreign matter detection sensor 13 includes a sensor section 21 that is a long string. As shown in FIG. 3, the sensor section 21 includes a long hollow insulating body 22 formed of elastically deformable insulating material (such as soft plastic material and elastomer). A band-like adhesion surface 22a, which extends in the longitudinal direction of the hollow insulating body 22, is formed on the outer circumferential surface of the hollow insulating body 22. The adhesion surface 22a is straight on a cross-section that is orthogonal to the longitudinal direction of the hollow insulating body 22 (for example, the end face 22f of the hollow insulating body 22 in the longitudinal direction shown in FIG. 3). Part of the outer circumferential surface of the hollow insulating body 22 except the adhesion surface 22a is substantially U-shaped and is open toward the adhesion surface 22a on the cross-section that is orthogonal to the longitudinal direction of the hollow insulating body 22. That is the cross-section of the hollow insulating body 22 that is orthogonal to the longitudinal direction is substantially D-shaped.

A hollow bore 22b, which extends in the longitudinal direction of the hollow insulating body 22, is formed inside the hollow insulating body 22. Four separation recesses 22c are formed to extend toward the outer circumference on the cross-section of the hollow bore 22b that is orthogonal to the longitudinal direction of the hollow insulating body 22. The separation recesses 22c are formed in four locations in the circumferential direction of the cross-section of the hollow insulating body 22, and are connected to one another at substantially the center portion of the cross-section. That is, the cross-sectional shape in the direction orthogonal to the longitudinal direction of the hollow insulating body 22 is substantially X-shaped. The four separation recesses 22c each extend in a helical form in the longitudinal direction of the hollow insulating body 22. Since the hollow bore 22b is formed, the hollow insulating body 22 is hollow.

Two electrode wires 23, 24, which are held by the hollow insulating body 22, are arranged inside the hollow insulating body 22 to oppose each other with a space in between. Each of the electrode wires 23, 24 includes a flexible core electrode 25, which is formed by twisting conductive thin wire, and a cylindrical conductive coating layer 26, which has conductivity and elasticity and coats the outer circumference of the core electrode 25. The two electrode wires 23, 24 are arranged inside the hollow insulating body 22 between the four separation recesses 22c, which are arranged in the circumferential direction. Two of the separation recesses 22c are arranged between the electrode wire 23 and the electrode wire 24 in the circumferential direction of the cross-section that is orthogonal to the longitudinal direction of the hollow insulating body 22. Furthermore, the two electrode wires 23, 24 are arranged inside the hollow insulating body 22 to be arranged at equal angular intervals in the circumferential direction (in this embodiment, intervals of 180°), and while keeping the intervals (intervals in the circumferential direction) to be constant, the two electrode wires 23, 24 helically extend along the separation recesses 22c in the longitudinal direction of the hollow insulating body 22. Parts of the electrode wires 23, 24 are embedded in the hollow insulating body 22 on the inner side of the hollow insulating body 22, and held by the hollow insulating body 22. The two electrode wires 23, 24 oppose each other in the direction that is orthogonal to the longitudinal direction of the hollow insulating body 22 via the hollow bore 22b at any position in the longitudinal direction of the hollow insulating body 22.

One of the longitudinal ends of the hollow insulating body 22 that is closer to the coupling portion between the door panel 5 and the vehicle body 3 (the left end in FIG. 2) is referred to as a first end 22d, and the other end. (the right end in FIG. 2) is referred to as a second end 22e. One of the ends of the sensor section 21 that corresponds to the first end 22d is referred to as a first end 21d, and the other end corresponding to the second end 22e is referred to as a second end 21e. The core electrodes 25 of the two electrode wires 23, 24 are each drawn out from the first end 22d of the hollow insulating body 22, and a resistor 28 is electrically connected between the two core electrodes 25. That is, the two electrode wires 23, 24 are electrically connected via the resistor 28 on the first end 22d of the hollow insulating body 22.

Also, as shown in FIG. 1, a terminal processing section 31 is provided on the second end 22e of each hollow insulating body 22. As shown in FIGS. 5(a) and 5(b), each terminal processing section 31 includes a support member 32, which is arranged adjacent to the second end 22e of the hollow insulating body 22, two power supply members 30, which supply electricity to the electrode wires 23, 24, and a sealing member 34, which embeds and seals, for example, the support member 32.

The support member 32 is formed of insulating plastic material. The support member 32 includes a terminal support portion 41 and a spacer 42 formed, integrally with the terminal support portion 41.

The terminal support portion 41 supports terminals 33 on both end faces in the thickness direction. The terminals 33 are formed of conductive metal plate material. Each terminal 33 includes a rectangular plate-like terminal main body 51, which has a transverse direction and a longitudinal direction, and a first connection piece 52 and a second connection piece 53, which are formed integrally with the terminal main body 51.

The longitudinal measurement of each terminal main body 51 is substantially the same as the longitudinal measurement of the terminal support portion 41, and the transverse measurement of each terminal main body 51 is substantially the same as the transverse measurement of the terminal support portion 41. The two terminal main bodies 51 are arranged on end faces of the terminal support portion 41 in the thickness direction such that the longitudinal direction, the transverse direction, and the thickness direction of the two terminal main bodies 51 match with the longitudinal direction, the transverse direction, and the thickness direction of the terminal support portion 41. As viewed from the thickness direction of the terminal support portion 41 (that is, the state shown in FIG. 5(b)), the two terminal main bodies 51 are arranged on the end faces of the terminal support portion 41 to be located within the range of the outer shape of the terminal support portion 41. The terminal support portion 41 supports the two terminals 33 to form a double structure in which the two terminals 33 overlap each other in the thickness direction while insulating the terminals 33 from each other.

In each terminal 33, the first connection piece 52 extends from one longitudinal end of the terminal main body 51 (the upper end in FIG. 5(b)), and the second connection piece 53 extends from the other longitudinal end of the terminal main body 51 (the lower end in FIG. 5(b)). The first connection piece 52 and the second connection piece 53 are rectangular plates.

A guide portion 43 is integrally formed on one longitudinal end of the terminal support portion 41. The guide portion 43 projects in one transverse direction of the terminal support portion 41. As shown in FIGS. 3 and 5(b), the measurement of the guide portion 43 in the longitudinal direction of the terminal support portion 41 is substantially equal to the longitudinal measurement of the opening portion of the hollow bore 22b at the end face 22f on the second end 22e of the hollow insulating body 22 (vertical measurement in FIG. 3). The measurement of the guide portion 43 in the thickness direction of the terminal support portion 41 is substantially equal to the thickness of the terminal support portion 41 including the terminal main body 51.

The spacer 42 is integrally formed with the distal end of the guide portion 43. The spacer 42 protrudes from the distal end center of the guide portion 43 in the transverse direction of the terminal support portion 41. The spacer 42 is columnar. The diameter of the spacer 42 is substantially equal to the width of the gap between the electrode wires 23, 24, which oppose each other inside the hollow insulating body 22, and is less than the thickness of the terminal support portion 41. The support member 32 is mounted on the hollow insulating body 22 in the state in which the distal end portion of the spacer 42 is inserted in the hollow bore 22b from the second end 22e of the hollow insulating body 22. In the first embodiment, the spacer 42 is inserted in the hollow bore 22b until the distal end face of the guide portion 43 abuts against the second end 22e of the hollow insulating body 22. The spacer 42, which is inserted in the hollow bore 22b (inside of the hollow insulating body 22) from the second end 22e, is arranged between the two electrode wires 23, 24 on the second end 22e and prevents contact between the electrode wires 23, 24.

Figure 4:
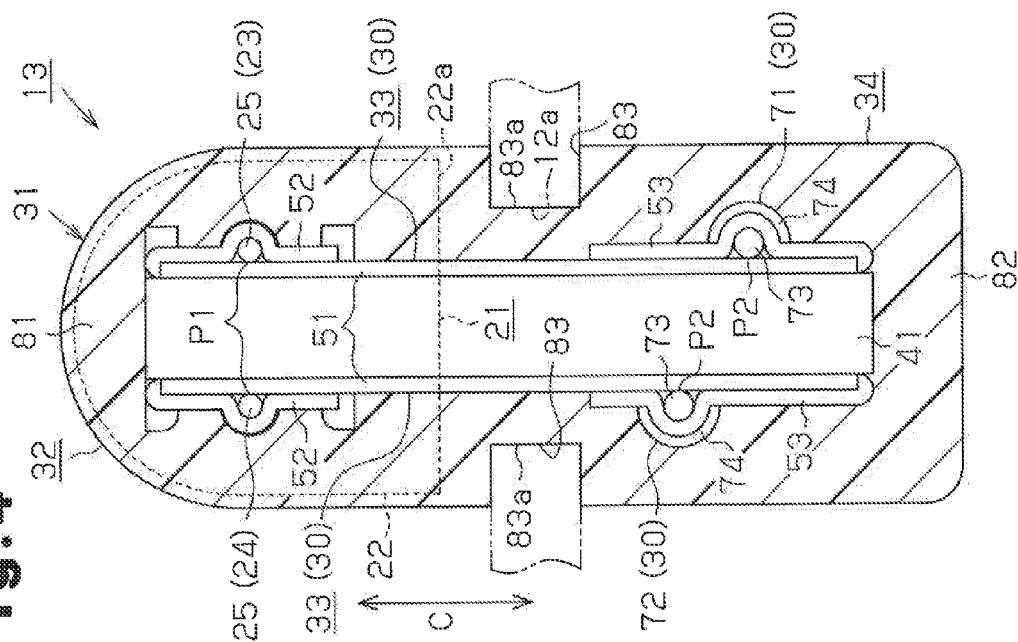
FIG. 4 is a cross-sectional view illustrating the foreign matter detection sensor.

As shown in FIGS. 5(a) and 5(b), the terminal support portion 41 of the support member 32 is arranged relative to the sensor section 21 such that the thickness direction of the terminal support portion 41 is parallel to the widthwise direction of the adhesion surface 22a. As shown in FIG. 4, the terminal support portion 41 opposes the widthwise center portion of the adhesion surface 22a in the longitudinal direction of the sensor section 21 (the direction perpendicular to the surface of the sheet of FIG. 4). As shown in FIG. 5(b), the longitudinal end of the terminal support portion 41 that is opposite to the end on which the guide portion 43 is provided (that is, the end on which the second connection piece 53 is arranged) protrudes to the outer circumference of the hollow insulating body 22 beyond the adhesion surface 22a. The longitudinal direction of the terminal support portion 41 is a direction that is orthogonal to the longitudinal direction of the sensor section 21 (in the first embodiment, the direction perpendicular to the adhesion surface 22a). Part of the terminal support portion 41 on the front side of the adhesion surface 22a (below the adhesion surface 22a in FIG. 5(b)) is longer than part of terminal support portion 41 on the back side of the adhesion surface 22a (above the adhesion surface 22a in FIG. 5(b)). Thus, the two terminals 33 supported by the terminal support portion 41 are arranged adjacent to the second end 22e of the hollow insulating body 22 such that the transverse direction of the terminals 33 corresponds to the longitudinal direction of the sensor section 21, and that the longitudinal direction of the terminals 33 is orthogonal to the longitudinal direction of the sensor section 21. The longitudinal direction of the terminals 33 is a direction that is orthogonal to the longitudinal direction of the sensor section 21 (in the first embodiment, the direction orthogonal to the adhesion surface 22a), Part of the terminals 33 on the front side of the adhesion surface 22a is longer than part of the terminals 33 on the back side of the adhesion surface 22a.

As shown in FIG. 3, the core electrodes 25 of the electrode wires 23, 24 are drawn out from the second end 22e of the hollow insulating body 22. In the first embodiment, the end face 22f at the second end 22e of the hollow insulating body 22 is formed at a position where the helically extending two electrode wires 23, 24 are separate in the direction parallel to the widthwise direction of the adhesion surface 22a. The end face 22f forms a right angle with the adhesion surface 22a. Thus, on the end face 22f, a straight line L1 that passes through the centers of the electrode wires 23, 24 is parallel to the widthwise direction of the adhesion surface 22a.

As shown in FIG. 4, since the terminal support portion 41 opposes, in the longitudinal direction of the sensor section 21, the center portion of the second end 22e of the hollow insulating body 22 in the widthwise direction of the adhesion surface 22a, the core electrodes 25 of the two electrode wires 23, 24 that are drawn out from the second end 22e of the hollow insulating body 22 are drawn out on both sides of the terminal support portion 41 in the thickness direction. That is, the terminal support portion 41 is arranged between the two core electrodes 25. Each terminal main body 51 and the opposing core electrode 25 are electrically connected on both sides of the terminal support portion 41 in the thickness direction. More specifically, the two core electrodes 25 extend on both sides of the terminal support portion 41 of the guide portion 43 in the thickness direction and are each arranged on the associated terminal main body 51. The first connection piece 52 of each terminal 33 is folded back to overlap the terminal main body 51, and sandwiches the associated core electrode 25 arranged on the terminal main body 51 between the first connection piece 52 and the terminal main body 51. The core electrode 25 sandwiched between the terminal main body 51 and the first connection piece 52 is electrically connected to the terminal 33 by soldering. In FIG. 5(b), a solder 61, which electrically connects the core electrode 25 to the terminal 33, is shown by a broken line in which a long dash alternates with a pair of short dashes. In this manner, the core electrodes 25 of the electrode wires 23, 24 are each electrically connected to one longitudinal end of the associated one of the two terminal main bodies 51. That is, a connection portion between each terminal 33 and the core electrode 25 of the associated one of the electrode wires 23, 24, which is an electrode connecting portion P1 in the first embodiment, is formed on one longitudinal end of each terminal 33 (the direction orthogonal to the longitudinal direction of the sensor section 21) adjacent to the longitudinal end (the second end 22e) of the sensor section 21 in the longitudinal direction of the sensor section 21.

As shown in FIGS. 4 and 5(b), lead wires 71, 72 are respectively electrically connected to the terminals 33. The lead wires 71, 72 are coated wires each including a conductive metal wire 73 coated by an insulating coating 74. The insulating coating 74 is removed at the distal end of each of the lead wires 71, 72, and the metal wire 73 is exposed. The two lead wires 71, 72 are each connected to the associated terminal 33 at a position that is displaced from the electrode connecting portion P1 in the direction orthogonal to the longitudinal direction of the sensor section 21. One of the two power supply members 30 according to the first embodiment is configured by the terminal 33 corresponding to the lead wire 71, and the other is configured by the terminal 33 corresponding to the lead wire 72.

The electrical connection between the lead wires 71, 72 and the terminals 33 will now be described. In the vicinity of the second end 22e of the hollow insulating body 22, the two lead wires 71, 72 are arranged to be adjacent to the sensor section 21 in the direction that is orthogonal to the longitudinal direction of the sensor section 21 at a position facing the adhesion surface 22a of the hollow insulating body 22, and to be parallel to the sensor section 21. That is, in the vicinity of the longitudinal end of the sensor section 21 close to the terminal processing section 31, the lead wires 71, 72 are arranged relative to the terminals 33 such that the longitudinal direction of the lead wires 71, 72 (arrow A in FIG. 5(b)) forms an angle of 0° with the longitudinal direction of the sensor section 21 (arrow B in FIG. 5(b)). Thus, in the vicinity of the longitudinal end of the sensor section 21 close to the terminal processing section 31, the longitudinal direction of the lead wires 71, 72 is parallel to the longitudinal direction of the sensor section 21. The distal ends of the two lead wires 71, 72 (parts where the metal wires 73 are exposed) are arranged on both sides of the terminal support portion 41 in the thickness direction. Thus, the distal ends of the two lead wires 71, 72 are adjacent to the terminals 33, which are arranged on both ends of the terminal support portion 41 in the thickness direction, in the thickness direction of the terminal support portion 41. The distal ends of the lead wires 71, 72 extend straight on the terminal main bodies 51 in the longitudinal direction of the sensor section 21. The distal ends of the lead wires 71, 72 are at positions displaced from the electrode connecting portions P1 in the direction that is orthogonal to the longitudinal direction of the sensor section 21 (arrow C in FIG. 5(b)), which is the longitudinal direction of the terminal main bodies 51. Each of the lead wires 71, 72 opposes the terminal main body 51 of the associated terminal 33 in the thickness direction of the terminal support portion 41. Thus, the distal end of each of the lead wires 71, 72 opposes the associated terminal main body 51 in the thickness direction of the terminal support portion 41 at the longitudinal end of the terminal main body 51 of the terminal 33 on which the second connection piece 53 is provided. The second connection piece 53 of each terminal 33 is folded back to overlap the terminal main body 51 and sandwiches the distal end of the associated one of the lead wires 71, 72 arranged on the terminal main body 51 between the second connection piece 53 and the terminal main body 51. The distal end of each of the lead wires 71, 72 sandwiched between the terminal main body 51 and the second connection piece 53 is electrically connected to the terminal 33 by soldering. In FIG. 5(b), a solder 62 that electrically connects each of the lead wires 71, 72 to the associated terminal 33 is shown by a broken line in which a long dash alternates with a pair of short dashes. In this manner, the two lead wires 71, 72 are electrically connected to the longitudinal ends of the terminal main bodies 51 of the two terminals 33 where the second connection pieces 53 are provided, and at the positions displaced from the electrode connecting portions P1 in the direction that is orthogonal to the longitudinal direction of the sensor section 21, which is the longitudinal direction of the terminal main bodies 51. That is, the lead wire connecting portions P2, which are the connecting portions of the terminals 33 and the lead wires 71, 72, are formed at positions of the terminals 33 displaced from the electrode connecting portions P1 in the direction that is orthogonal to the longitudinal direction of the sensor section 21 toward the outer circumference of the hollow insulating body 22. As shown in FIG. 4, the lead wire connecting portion P2 that is located on one side of the terminal support portion 41 in the thickness direction and the lead wire connecting portion P2 that is located on the other side of the terminal support portion 41 in the thickness direction are displaced from each other in the longitudinal direction of the terminal support portion 41, which is the direction that is orthogonal to the longitudinal direction of the sensor section 21. The thickness direction of the terminal support portion 41 corresponds to the widthwise direction of the adhesion surface 22*a* in the first embodiment.

Since the lead wires 71, 72 are connected to the terminals 33 as described above, the distal ends of the lead wires 71, 72 and the end portions of the terminals 33 to which the lead wires 71, 72 are connected form a bent portion 301, which is bent at substantially a right angle. The bent portion 301 is bent such that part of the power supply member 30 extending in the direction opposite to the electrode connecting portion P1 from the bent portion 301 extends toward the first end of the sensor section 21. The terminal 33 and the bent portion 301 of each power supply member 30 configure a direction changing section 310. With this configuration, the direction changing section 310 extends from the electrode connecting portion P1 in the direction intersecting the longitudinal direction of the sensor section 21, and further extends toward the first end 21*d* of the sensor section 21 in the longitudinal direction.

The sealing member 34 is formed of insulating plastic material. As shown in FIGS. 5(*a*) and 5(*b*), the sealing member 34 embeds and seals part of the support member 32 located outside of the hollow insulating body 22, the terminals 33, the electrode connecting portions P1, the lead wire connecting portions P2, and the second end 22*e* of the hollow insulating body 22. The sealing member 34 includes a terminal coating section 81, which is adjacent to the second end 22*e* of the hollow insulating body 22 in the longitudinal direction of the sensor section 21, and a mounting leg 82, which is formed integrally with the terminal coating section 81.

The terminal coating section 81 embeds the second end 22*e* of the hollow insulating body 22, and is formed integrally with the end face 22*f* of the hollow insulating body 22 on the second end 22*e*. The terminal coating section 81 embeds and seals part of the terminal support portion 41 adjacent to the second end 22*e* of the hollow insulating body 22 in the longitudinal direction of the sensor section 21, part of the two terminals 33 adjacent to the second end 22*e* of the hollow insulating body 22 in the longitudinal direction of the sensor section 21 (approximately half of the terminals 33 in the longitudinal direction where the electrode wires 23, 24 are connected), the guide portion 43, and the electrode connecting portions P1. Thus, the sealing member 34 seals the direction changing section 310. As shown in FIG. 4, the outer shape of the terminal coating section 81 is a size larger than the outer shape of the hollow insulating body 22, and the shape of the cross-section of the terminal coating section 81 orthogonal to the longitudinal direction of the sensor section 21 is substantially a D-shape. As shown in FIGS. 5(*a*) and 5(*b*), the end of the terminal coating section 81 close to the second end 22*e* of the hollow insulating body 22 is in close contact with the second end 22*e* to be liquid-tight and air-tight.

The mounting leg 82 is formed integrally with the end of the terminal coating section 81 close to the lead wires 71, 72 and the adhesion surface 22*a* on the second end 22*e* of the hollow insulating body 22. The mounting leg 82 protrudes further outward than the outer circumferential surface of the hollow insulating body 22, and is substantially a rectangular solid in the first embodiment. The mounting leg 82 has a width slightly greater than the adhesion surface 22*a*. The measurement of the mounting leg 82 in the longitudinal direction of the sensor section 21 is substantially equal to the measurement of the terminal coating section 81 in the longitudinal direction of the sensor section 21. The mounting leg 82 incorporate and seals part of the terminal support portion 41 that protrudes further outward than the outer circumferential surface of the hollow insulating body 22, parts of the two terminals 33 that protrude further outward than the outer circumferential surface of the hollow insulating body 22 (approximately half of the terminals 33 in the longitudinal direction where the lead wires 71, 72 are connected), and the lead wire connecting portions P2. The mounting leg 82 embeds and seals the distal ends of the lead wires 71, 72 (parts where the metal wires 73 are exposed and the distal ends of the insulating coatings 74). The longitudinal direction of the sealing member 34 is the direction that is orthogonal to the longitudinal direction of the sensor section 21 (the direction orthogonal to the adhesion surface 22*a* in the first embodiment). Part of the sealing member 34 at the front side of the adhesion surface 22*a* is longer than part of the sealing member 34 at the back side of the adhesion surface 22*a*.

The two lead wires 71, 72 are drawn out to the outside of the mounting leg 82 from one of longitudinal end faces (an end face 82*a*) of the mounting leg 82 closer to the sensor section 21 to be parallel to the sensor section 21. Thus, draw-out positions P3 of the sealing member 34 where the lead wires 71, 72 are drawn out from the sealing member 34 are located on the end face 82*a*. Inside the sealing member 34, the lead wire connecting portions P2 are displaced relative to the electrode connecting portions P1 on the terminals 33 in the direction that is orthogonal to the longitudinal direction of the sensor section 21 (arrow C in FIG. 5(*b*)) to approach the draw-out positions P3. Inside the sealing member 34, the lead wires 71, 72 extend straight from the lead wire connecting portions P2 to the draw-out positions P3.

As shown in FIG. 4, a pair of mounting engagement portions 83 is formed in the mounting leg 82. The pair of mounting engagement portions 83 is formed on both widthwise sides of the mounting leg 82 (the direction that is the same as the widthwise direction of the adhesion surface 22*a*), that is, on both sides of the mounting leg 82 in the thickness direction of the terminal support portion 41. The mounting engagement portions 83 are grooves that extend in the longitudinal direction of the sensor section 21, and through the mounting leg 182 in the longitudinal direction of the sensor section 21. The pair of mounting engagement portions 93 is formed between the electrode connecting portions P1 and the lead wire connecting portions P2 in the longitudinal direction of the terminal support portion 41 (the vertical direction in FIG. 4), and between the first connection pieces 52 and the second connection pieces 53. The width of the part of the mounting leg 82 where the pair of mounting engagement portions 83 is formed (the width in the direction that is the same as the widthwise direction of the adhesion surface 22*a*) is reduced. However, the terminal support portion 41 and the terminal main bodies 51 are embedded between bottom surfaces 83*a* of the pair of mounting engagement portions 83, that is, at the part of the mounting leg 82 where the width is reduced by the pair of mounting engagement portions 83. That is, parts of the two terminals 33 are embedded inside the mounting leg 82 at the back side of the mounting engagement portions 83.

The sealing member 34 as described above seals the terminal support portion 41, the two terminals 33, the electrode connecting portions P1, and the lead wire connecting portions P2 to be liquid-tight and air-tight. The mounting leg 82 is engaged with the associated bracket 12 by inserting part of the mounting leg 82 between the pair of mounting engagement portions 83 (that is, part of the mounting leg 82 between the bottom surfaces 83*a* of the pair of mounting engagement portions 83) in an engaging groove 12*a* formed at the longitudinal end of each bracket 12. Both sides of the engaging groove 12*a* of the bracket 12 are inserted in the pair of mounting engagement portions 83. Thus, the longitudinal end of the foreign matter detection sensor 13 close to the sealing member 34 is secured to the bracket 12 by the mounting leg 82. As shown in FIG. 5(b), the adhesion surface 22a of the hollow insulating body 22 is adhered to the bracket 12 by a double-sided tape 15 so that the foreign matter detection sensor 13 is secured to the bracket 12. The two lead wires 71, 72, which extend from the mounting leg 82 of the sealing member 34, extend toward the first end 22d (right side in FIG. 5(b)) in parallel to the sensor section 21, and then drawn into the door panel 5. As shown in FIG. 2, the lead wire 71 drawn into the door panel 5 is electrically connected to the current detector 14 inside the door panel 5. The lead wire 72, which is drawn into the door panel 5, is connected to a ground GND (that is, grounded to the vehicle body 3) inside the door panel 5.

As shown in FIGS. 1 and 2, the current detector 14 is arranged inside the door panel 5. The current detector 14 supplies current to the electrode wire 23. In a normal state in which external force such as pressure is not applied to the sensor section 21, the current supplied to the electrode wire 23 from the current detector 14 flows to the electrode wire 24 via the resistor 28. When external force that crushes the sensor section 21 is applied, part of the hollow insulating body 22 on which the external force is applied, is elastically deformed. The elastic deformation of the hollow insulating body 22 flexes the electrode wires 23, 24 so that the electrode wire 23 and the electrode wire 24 contact each other and are short-circuited. Then, the current supplied to the electrode wire 23 from the current detector 14 flows to the electrode wire 24 without flowing through the resistor 28. Therefore, for example, since the current value changes when current is supplied to the electrode wire 23 at a constant voltage, the current detector 14 detects changes of the current value at this time, and detects foreign matter that contacts the sensor section 21. Upon detection of changes of the current value, that is, upon detection of foreign matter that contacts the foreign matter detection sensor 13, the current detector 14 outputs a foreign matter detection signal to a later-described door ECU 91. When the external force applied to the sensor section 21 is removed, the hollow insulating body 22 restores, and the electrode wires 23, 24 also restores to be in a non-conductive state.

The motor-driven back door device 2 includes the door ECU 91, which controls opening and closing operation of the door panel 5 by the actuator 6. The door ECU 91 functions as a microcomputer, includes a read only memory (ROM) and a random access memory (RAM), and receives power from a battery (not shown) of the vehicle 1. The door ECU 91 supplies current to the current detector 14, which is electrically connected to the door ECU 91. The door ECU 91 controls the actuator 6 based on various types of signals input from the manipulation switch 9, the position detection device 8, and the current detector 14.

The overall operation of the motor-driven back door device 2 configured as described above will now be described.

The door ECU 91 recognizes the rotational position of the door panel 5 based on position detection signals received from the position detection device 8. More specifically, the door ECU 91 counts the number of pulse of the position detection signal, and recognizes the rotational position of the door panel 5 based on the count value.

Upon receipt of an open signal from the manipulation switch 9, the door ECU 91 drives the actuator 6 to open the door panel 5. When the door panel 5 reaches the fully opened position, the door ECU 91 stops the actuator 6.

Upon receipt of a close signal from the manipulation switch 9, the door ECU 91 drives the actuator 6 to close the door panel 5. When the door panel 5 reaches the fully closed position, the door ECU 91 stops the actuator 6. During closing operation of the door panel 5, if foreign matter contacts the sensor section 21 of the foreign matter detection sensor 13 and external force is applied to the sensor section 21, the hollow insulating body 22 of the foreign matter detection sensor 13 is elastically deformed so that the electrode wire 23 and the electrode wire 24 contact each other and are short-circuited. As a result, since the current value of the current supplied to the electrode wire 23 changes, the current detector 14 outputs a foreign matter detection signal to the door ECU 91. Upon receipt of the foreign matter detection signal, the door ECU 91 reverses the actuator 6 to open the door panel 5 by a predetermined amount and subsequently stops the actuator 6.

Operation of the foreign matter detection sensor 13 according to the first embodiment will now be described.

As shown in FIG. 5(b), in the vicinity of the second end 21e of the sensor section 21, the two lead wires 71, 72 are arranged to be adjacent to the sensor section 21 in the direction orthogonal to the longitudinal direction of the sensor section 21 at a position facing the adhesion surface 22a of the hollow insulating body 22, and to be parallel to the sensor section 21. That is, in the vicinity of the second end 21e of the sensor section 21, the lead wires 71, 72 are arranged relative to the terminals 33 such that the longitudinal direction of the lead wires 71, 72 forms an angle of 0° with the longitudinal direction of the sensor section 21. Thus, in each of the foreign matter detection sensors 13, which are secured to the door panel 5 via the brackets 12, even if the lead wires 71, 72 are arranged to extend toward the end of the sensor section 21 corresponding to the first end 22d, that is, the first end 21d (right side in FIG. 5(b)), the lead wires 71, 72 do not protrude from the sealing member 34 in the longitudinal direction of the sensor section 21 at the end of the sensor section 21 corresponding to the second end 22e, that is, in the vicinity of the second end 21e.

The lead wire connecting portions P2 are displaced relative to the electrode connecting portions P1 on the terminals 33 in the direction orthogonal to the longitudinal direction of the sensor section 21 so as to approach the draw-out positions P3 at which the lead wires 71, 72 are drawn out from the sealing member 34. Thus, the distal ends of the lead wires 71, 72 connected to the terminals 33 approach the draw-out positions P3.

As described above, the first embodiment has the following advantages.

(1) The lead wires 71, 72 are arranged relative to the two terminals 33 such that the longitudinal direction of the lead wires 71, 72 forms an angle of 0° with the longitudinal direction of the sensor section 21. Thus, when the lead wires 71, 72 are arranged to extend from the second end 21e of the sensor section 21 to which the lead wires 71, 72 are connected (that is, the end corresponding to the second end 22e) toward the first end 21d on the opposite side (that is, the end corresponding to the first end 22d), the lead wires 71, 72 are prevented from protruding from the sealing member 34 in the longitudinal direction of the sensor section 21. Thus, since the lead wires 71, 72 do not protrude from the sealing member 34 in the longitudinal direction of the sensor section 21, the measurement of the sensor section 21 is increased in the longitudinal direction by the corresponding amount. As a result, in each of the foreign matter detection sensors 13, the detection range of the foreign matter is increased in the longitudinal direction of the sensor section 21. Also, the lead wire connecting portions P2 are displaced relative to the electrode connecting portions P1 on the terminals 33 in the direction orthogonal to the longitudinal direction of the sensor section 21 so as to approach the draw-out positions P3 at which the lead wires 71, 72 are drawn out from the sealing member 34. Thus, the distal ends of the lead wires 71, 72 connected to the terminals 33 approach the draw-out positions P3. This reduces the measurement of the lead wires 71, 72 that are used. As a result, the manufacturing costs are reduced.

(2) The support member 32 supports the two terminals 33 so as to form the double structure while insulating the two terminals 33 from each other. Thus, as compared to the case in which the two terminals 33 are arranged without overlapping each other, the size of the sealing member 34 is reduced in the longitudinal direction of the sensor section 21. The measurement of the sensor section 21 is increased in the longitudinal direction by the amount corresponding to the measurement of the sealing member 34 reduced in the longitudinal direction. As a result, in each foreign matter detection sensor 13, the detection range of the foreign matter is increased in the longitudinal direction of the sensor section 21.

(3) The lead wires 71, 72 extend straight from the lead wire connecting portions P2 to the draw-out positions P3, and are drawn out from the sealing member 34 to be adjacent to the sensor section 21 in the direction orthogonal to the longitudinal direction of the sensor section 21 and to be parallel to the sensor section 21. Thus, the lead wires 71, 72 drawn out from the sealing member 34 extend toward the first end 21d of the sensor section 21 in the vicinity of the second end 21e of the sensor section 21 at which the lead wires 71, 72 are connected. Thus, the lead wires 71, 72 are arranged to extend toward the first end 21d of the sensor section 21 without bending the lead wires 71, 72. Also, a space for arranging the lead wires 71, 72 is reduced in the direction orthogonal to the longitudinal direction of the sensor section 21.

(4) Since the terminals 33 are arranged such that the transverse direction of the terminals 33 corresponds to the longitudinal direction of the sensor section 21, the size of the terminals 33 and the sealing member 34 for sealing the terminals 33 is reduced in the longitudinal direction of the sensor section 21. The measurement of the sensor section 21 is increased in the longitudinal direction by the amount corresponding to the size of the sealing member 34 reduced in the longitudinal direction. As a result, in each foreign matter detection sensor 13, the detection range of the foreign matter is further increased in the longitudinal direction of the sensor section 21.

(5) Since parts of the terminals 33 are embedded in the mounting leg 82, the mounting leg 82 that protrudes outward from the outer circumferential surface of the hollow insulating body 22 is reinforced by the terminals 33.

(6) The two terminals 33 are insulated from each other and are supported by the support member 32. Thus, the support member 32 reinforces the terminals 33. Also, since the terminals 33 are easily maintained in a state separated from each other by supporting the terminals 33 with the support member 32, electric insulation between the two terminals 33 is easily ensured. Also, since the two terminals 33 are arranged relative to the sensor section 21 by arranging the support member 32 relative to the sensor section 21, the position of the two terminals 33 relative to the sensor section 21 is easily determined.

(7) Parts of the terminals 33 are embedded in part of the mounting leg 82 where the width is reduced by forming the mounting engagement portions 83. Thus, part of the mounting leg 82 where the mounting engagement portions 83 are formed is reinforced by the terminals 33.

(8) The longitudinal direction of the sealing member 34 is orthogonal to the longitudinal direction of the sensor section 21. Part of the sealing member 34 that is on the front side of the adhesion surface 22a provided on the outer circumferential surface of the hollow insulating body 22 is longer than part of the sealing member 34 that is on the back side. Thus, in the state in which the adhesion surface 22a is adhered to the bracket 12, the sealing member 34 is prevented from protruding greatly toward the back side of the adhesion surface 22a from the outer circumferential surface of the hollow insulating body 22. Therefore, the appearance of the foreign matter detection sensor 13 mounted on the mounting position (in the first embodiment, the edge of the door panel 5) is improved.

(9) The electrode wires 23, 24 helically extend in the longitudinal direction of the hollow insulating body 22. Thus, the positions on the end face 22f from which the electrode wires 23, 24 are drawn out are easily changed by adjusting the position of the end face 22f to be provided on the second end 22e of the hollow insulating body 22 in the longitudinal direction of the sensor section 21. Also, since the electrode wires 23, 24 helically extend in the longitudinal direction of the hollow insulating body 22, the detection range in the circumferential direction of the sensor section 21 is increased as compared to, for example, a sensor section that includes a pair of electrodes, which linearly extend in the longitudinal direction of the hollow insulating body 22 inside the hollow insulating body 22. Furthermore, even when the sensor section 21 is bent in any direction, the electrode wires 23, 24 are unlikely to contact each other at the bent portion. Thus, the degree of freedom for arranging the foreign matter detection sensor 13 is increased.

(10) The lead wires 71, 72 are drawn out from the mounting leg 82, which protrudes to the outer circumference of the hollow insulating body 22. Thus, in the vicinity of the second end 21e of the sensor section 21, the lead wires 71, 72 are easily arranged to be parallel to the sensor section 21 without bending the lead wires 71, 72.

(11) The lead wires 71, 72 are not bent inside the sealing member 34. This reduces the measurement of the lead wires 71, 72 that are used. Furthermore, since the space for arranging the lead wires 71, 72 in the sealing member 34 is reduced as compared to the case in which the lead wires 71, 72 are bent inside the sealing member 34, the size of the sealing member 34 is reduced.

(12) The two lead wire connecting portions P2 embedded inside the mounting leg 82 are displaced in the direction orthogonal to the longitudinal direction of the sensor section 21 in the longitudinal direction of the terminal support portion 41. That is, the two lead wire connecting portions P2 are displaced in the direction orthogonal to the widthwise direction of the mounting leg 82 (the direction that is the same as the widthwise direction of the adhesion surface 22a). Thus, for example, the width of the mounting leg 82 is partially reduced as compared to the case in which the two lead wire connecting portions P2 are not displaced in the direction orthogonal to the longitudinal direction of the sensor section 21.

Second Embodiment

A foreign matter detection sensor according to a second embodiment of the present invention will now be described. The second embodiment mainly differs from the first embodiment in the structure of the terminal processing section 31. The differences in this respect will mainly be discussed below. Like or the same reference numerals are given to those components that are like or the same as the corresponding components of the first embodiment, and detailed explanations are omitted.

The terminal support portion 41 according to the second embodiment is a rectangular plate. The thickness of the terminal support portion 41 is thinner than the thickness of the hollow insulating body 22, and is substantially equal to the distance D1 between the core electrodes 25 of the two electrode wires 23, 24. The spacer 42 is integrally formed at the end of the terminal support portion 41 adjacent to the second end 22e. The spacer 42 protrudes from the center of the end of the terminal support portion 41 opposing the second end 22e of the hollow insulating body 22. The spacer 42 is columnar. The diameter of the spacer 42 is less than the thickness of the terminal support portion 41, and is substantially equal to the width of the gap between the electrode wires 23, 24, which oppose each other inside the hollow insulating body 22. The support member 32 is mounted on the hollow insulating body 22 in a state in which the distal end of the spacer 42 is inserted in the hollow bore 22b from the second end 22e of the hollow insulating body 22. In the second embodiment, the spacer 42 is inserted in the hollow bore 22b until the end surface of the terminal support portion 41 opposing the second end 22e of the hollow insulating body 22 abuts against the second end 22e. The spacer 42 that is inserted in the hollow bore 22b (inside of the hollow insulating body 22) from the second end 22e is arranged between the two electrode wires 23, 24 at the second end 22e, and prevents contact between the electrode wires 23, 24.

Figure 6:
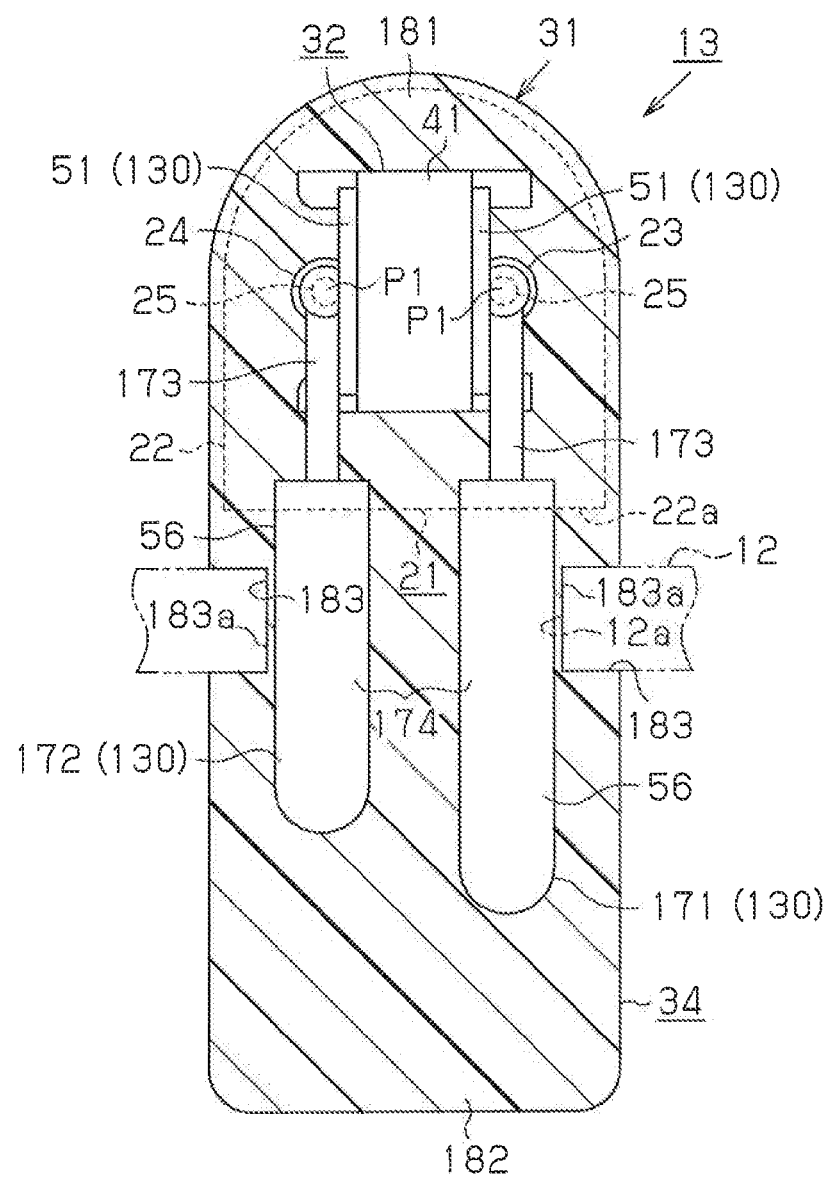
FIG. 6 is a cross-sectional view illustrating a foreign matter detection sensor according to a second embodiment of the present invention.

As shown in FIGS. 6, 7(a), and 7(b), in the support member 32 mounted on the hollow insulating body 22, the terminal support portion 41 is arranged relative to the sensor section 21 such that the thickness direction of the terminal support portion 41 is parallel to the widthwise direction of the adhesion surface 22a. The support member 32 is arranged within the range of the outer shape of the hollow insulating body 22 as viewed from the longitudinal direction of the sensor section 21 (left and right direction in FIG. 7(b)).

Two power supply members 130 are configured by a pair of terminals 51, and a pair of lead wires 171, 172. That is, one of the power supply members 130 includes one of the terminals 51 and the lead wire 171, and is electrically connected to the electrode wire 23 to supply power to the electrode wire 23. Similarly, the other one of the power supply members 130 includes the other one of the terminals 51 and the lead wire 172, and is electrically connected to the electrode wire 24 to supply power to the electrode wire 24.

One of the terminals 51 is secured to one end face of the terminal support portion 41 in the thickness direction, and the other one of the terminals 51 is secured to the other end face of the terminal support portion 41 in the thickness direction. That is, the terminal support portion 41 supports the terminals 51 on both end faces in the thickness direction. Each terminal 51 is formed of conductive metal plate, and is a rectangular plate that is a size larger than the terminal support portion 41. The two terminals 51 are arranged on the end faces of the terminal support portion 41 in the thickness direction such that the thickness direction of the two terminals 51 match with the thickness direction of the terminal, support portion 41. The terminal support portion 41 supports the two terminals 51 so as to form a double structure in which the two terminals 51 are overlapped with each other in the thickness direction while insulating the two terminals 51 from each other.

As shown in FIG. 3, the core electrodes 25 of the electrode wires 23, 24 are drawn out from the second end 22e of the hollow insulating body 22. In the second embodiment, the end face 22f at the second end 22e of the hollow insulating body 22 is formed at a position where the helically extending two electrode wires 23, 24 are separate in the direction parallel to the widthwise direction of the adhesion surface 22a. The end face 22f forms a right angle with the adhesion surface 22a. Thus, on the end face 22f, the straight line L1 that passes through the center of the electrode wires 23, 24 is parallel to the widthwise direction of the adhesion surface 22a.

As shown in FIG. 6, the core electrodes 25 of the two electrode wires 23, 24, which are drawn out from the second end 22e of the hollow insulating body 22, are drawn out to both sides of the terminal support portion 41 in the thickness direction. That is, the terminal support portion 41 is arranged between the two core electrodes 25. Each of the terminals 51 and the opposing core electrode 25 are electrically connected on both sides of the terminal support portion 41 in the thickness direction. More specifically, weld beads are formed in advance by arc welding (for example, TIG welding) on the distal ends of the core electrodes 25 of the electrode wires 23, 24, and the distal ends of the core electrodes 25 are respectively connected to the terminals 51 by resistance welding. Accordingly, the electrode wires 23, 24 are electrically connected to the corresponding terminals 51.

As shown in FIGS. 6 and 7(b), the lead wires 171, 172 are electrically connected to the terminals 51. The lead wires 171, 172 are coated wires each including a conductive metal wire 173 coated by an insulating coating 174. The insulating coating 174 is removed at the distal end of each of the lead wires 171, 172, and the associated metal wire 173 is exposed. Weld beads are formed in advance by arc welding (for example, TIG welding) on the distal ends of the metal wires 173 of the lead wires 171, 172, and the distal ends of the metal wires 173 at which the weld beads are formed are connected to the terminals 51 by resistance welding. Accordingly, the lead wires 171, 172 are electrically connected to the corresponding terminals 51. The lead wire 171 is welded to a position on one of the terminals 51 that is the same as the position where the core electrode 25 of the electrode wire 23 is connected, and is electrically connected to the electrode wire 23. Similarly, the lead wire 172 is welded to a position on the other one of the terminals 51 that is the same as the position where the core electrode 25 of the electrode wire 24 is connected, and is electrically connected to the electrode wire 24. The connecting portion between the electrode wire 23 and the lead wire 171, and the connecting portion between the electrode wire 24 and the lead wire 172 are referred to as electrode connecting portions P1.

The lead wires 171, 172 extend from the electrode connecting portions P1 in a direction that is orthogonal to the sensor section 21 (in the second embodiment, in a direction that is orthogonal to the adhesion surface 22a and towards the front side of the adhesion surface 22a), and are then bent to extend toward the first end 21d of the sensor section 21. Thereafter, the lead wires 171, 172 extend toward the first end 21d of the sensor section 21 to be parallel to the sensor section 21. That is, the lead wires 171, 172 have direction changing sections 175 at the distal ends, and the direction changing sections 175 extend from the electrode connecting portions P1 in a direction intersecting the sensor section 21 (in the second embodiment, in the direction orthogonal to the adhesion surface 22a), and further extend in the direction toward the first end 21d of the sensor section 21 (the end corresponding to the first end 22d). The direction changing sections 175 include bent portions 176, which are bent such that the direction in which the lead wires 171, 172 extend is changed from the direction that separates from the electrode connecting portions P1 to the direction toward the first end 21d of the sensor section 21.

The sealing member 34 is formed of insulating plastic material. As shown in FIGS. 7(a) and 7(b), the sealing member 34 embeds and seals part of the support member 32 arranged outside of the hollow insulating body 22, the terminals 51, the electrode connecting portions P1, the distal ends of the lead wires 171, 172, and the second end 22e of the hollow insulating body 22. The sealing member 34 includes a terminal coating section 181, which is adjacent to the second end 22e of the hollow insulating body 22 in the longitudinal direction of the sensor section 21, and a mounting leg 182, which is formed integrally with the terminal coating section 181.

The terminal coating section 181 embeds the second end 22e of the hollow insulating body 22, and is formed integrally with the end face 22f on the second end 22e of the hollow insulating body 22. The terminal coating section 181 embeds and seals the terminal support portion 41, the two terminals 51, the electrode connecting portions P1, and parts of the direction changing sections 175 in the vicinity of the electrode connecting portions P1. Also, as shown in FIG. 6, the outer shape of the terminal coating section 181 is a size larger than the outer shape of the hollow insulating body 22, and the cross-section of the terminal coating section 181 that is orthogonal to the longitudinal direction of the sensor section 21 is substantially D-shaped. As shown in FIGS. 7(a) and 7(b), the end of the terminal coating section 181 close to the second end 22e of the hollow insulating body 22 is in close contact with the second end 22e to be liquid-tight and air-tight.

The mounting leg 182 is formed integrally with the end of the terminal coating section 181 close to the lead wires 171, 172 and the adhesion surface 22a at the second end 22e of the hollow insulating body 22. The mounting leg 182 protrudes toward the front side of the adhesion surface 22a (below the adhesion surface 22a in FIG. 7(b)) to the outer side than the outer circumferential surface of the hollow insulating body 22, and has a substantially rectangular solid shape. The mounting leg 182 is slightly wider than the adhesion surface 22a, and the measurement of the mounting leg 182 in the longitudinal direction of the sensor section 21 is substantially equal to the measurement of the terminal coating section 181 in the longitudinal direction of the sensor section 21. The mounting leg 182 embeds and seals part of the lead wires 171, 172 in the vicinity of the distal ends, that is, part of the direction changing sections 175 in the vicinity of the bent portions 176. The two lead wires 171, 172 are drawn out to the outside of the mounting leg 182 from one of longitudinal end faces (an end face 182a) of the mounting leg 182 closer to the sensor section 21 to be parallel to the sensor section 21. Parts of the lead wires 171, 172 that extend from the bent portions 176 toward the end face 182a inside the sealing member 34 extend linearly to the end face 182a to be substantially parallel to the longitudinal direction of the sensor section 21. The direction changing sections 175 of the power supply members 130 correspond to the section embedded in the sealing member 34.

As shown in FIG. 6, a pair of mounting engagement portions 183 is formed in the mounting leg 182. The pair of mounting engagement portions 183 are formed on both sides of the mounting leg 182 in the widthwise direction (the direction that is the same as the widthwise direction of the adhesion surface 22a), that is, on both sides of the mounting leg 182 in the thickness direction of the terminal support portion 41. The pair of mounting engagement portions 183 are recesses formed to reduce the width of the mounting leg 182. The mounting engagement portions 183 are grooves that extend in the longitudinal direction of the sensor section 21 through the mounting leg 182 in the longitudinal direction of the sensor section 21. The pair of mounting engagement portions 183 is formed at a position between the electrode connecting portions P1 and the bent portions 176 in a direction that is orthogonal to the longitudinal direction of the sensor section 21 (in the second embodiment, a direction orthogonal to the adhesion surface 22a). The width of part of the mounting leg 182 where the pair of mounting engagement portions 183 is formed (the width in the same direction as the widthwise direction of the adhesion surface 22a) is reduced. However, the direction changing sections 175 of the lead wires 171, 172 are embedded between bottom surfaces 183a of the pair of mounting engagement portions 183, that is, at part of the mounting leg 182 where the width is reduced by the pair of mounting engagement portions 183. That is, parts of the two lead wires 171, 172 are located on the back side of the mounting engagement portions 183 inside the mounting leg 182.

The sealing member 34 as described above seals the terminal support portion 41, the two terminals 51, the electrode connecting portions P1, and parts of the lead wires 171, 172 close to the distal ends to be liquid-tight and air-tight. The mounting leg 182 is engaged with the bracket 12 by inserting part of the mounting leg 182 between the pair of mounting engagement portions 183 (that is, part of the mounting leg 182 between the bottom surfaces 183a) in the engaging groove 12a formed in the longitudinal end of the bracket 12. Then, parts of the bracket 12 on both sides of the engaging groove 12a are inserted in the pair of mounting engagement portions 183. Thus, the longitudinal end of the foreign matter detection sensor 13 close to the sealing member 34 is secured to the bracket 12 by the mounting leg 182. As shown in FIG. 7(b), the adhesion surface 22a of the hollow insulating body 22 is adhered to the bracket 12 by the double-sided tape 15 so that the foreign matter detection sensor 13 is secured to the bracket 12. The two lead wires 171, 172, which extend from the mounting leg 182 of the sealing member 34, extend toward the first end 22d (right side in FIG. 7(b)) in parallel to the sensor section 21, and are then drawn into the door panel 5. As shown in FIG. 2, the lead wire 171 drawn in to the door panel 5 is electrically connected to the current detector 14 inside the door panel 5. The lead wire 172, which is drawn into the door panel 5 is connected to the ground GND (that is, grounded to the vehicle body 3) inside the door panel 5.

As shown in FIGS. 1 and 2, the current detector 14 is arranged inside the door panel 5. The current detector 14 supplies current to the electrode wire 23. In the normal state, in which external force such as pressure is not applied to the sensor section 21, the current supplied to the electrode wire 23 from the current detector 14 flows to the electrode wire 24 via the resistor 28. When external force that crushes the sensor section 21 is applied, part of the hollow insulating body 22 on which the external force is applied is elastically deformed. The elastic deformation of the hollow insulating body 22 flexes the electrode wires 23, 24 so that the electrode wire 23 and the electrode wire 24 contact each other and are short-circuited. Then, the current supplied to the electrode wire 23 from the current detector 14 flows to the electrode wire 24 without flowing through the resistor 28. Therefore, for example, since the current value changes when current is supplied to the electrode wire 23 at a constant voltage, the current detector 14 detects changes of the current value at this time, and detects foreign matter that contacts the sensor section 21. Upon detection of changes of the current value, that is, upon detection of foreign matter that contacts the foreign matter detection sensor 13, the current detector 14 outputs a foreign matter detection signal to the door ECU 91. When the external force applied to the sensor section 21 is removed, the hollow insulating body 22 restores, and the electrode wires 23, 24 also restores to be in a non-conductive state.

The motor-driven back door device 2 includes the door ECU 91, which controls opening and closing operation of the door panel 5 by the actuator 6. The door ECU 91 functions as a microcomputer, includes a read only memory (ROM) and a random access memory (RAM), and receives power from a battery (not shown) of the vehicle 1. The door ECU 91 supplies current to the current detector 14, which is electrically connected to the door ECU 91. The door ECU 91 controls the actuator 6 based on various types of signals input from the manipulation switch 9, the position detection device 8, and the current detector 14.

The operation of the motor-driven back door device 2 configured as described above will now be described.

The door ECU 91 recognizes the rotational position of the door panel 5 based on position detection signals received from the position detection device 8. More specifically, the door ECU 91 counts the number of pulse of the position detection signal, and recognizes the rotational position of the door panel 5 based on the count value.

Upon receipt of an open signal from the manipulation switch 9, the door ECU 91 drives the actuator 6 to open the door panel 5. When the door panel 5 reaches the fully opened position, the door ECU 91 stops the actuator 6.

Upon receipt of a close signal from the manipulation switch 9, the door ECU 91 drives the actuator 6 to close the door panel 5. When the door panel 5 reaches the fully closed position, the door ECU 91 stops the actuator 6. During closing operation of the door panel 5, if foreign matter contacts the sensor section 21 of the foreign matter detection sensor 13 and external force is applied to the sensor section 21, the hollow insulating body 22 of the foreign matter detection sensor 13 is elastically deformed so that the electrode wire 23 and the electrode wire 24 contact each other and are short-circuited. As a result, since the current value of the current supplied to the electrode wire 23 changes, the current detector 14 outputs a foreign matter detection signal to the door ECU 91. Upon receipt of the foreign matter detection signal, the door ECU 91 reverses the actuator 6 to open the door panel 5 by a predetermined amount and subsequently stops the actuator 6.

Operation of the foreign matter detection sensor 13 according to the second embodiment will now be described.

As shown in FIG. 7(b), the lead wire 171, which configures one of the power supply members 130, has the direction changing section 175, which includes the bent portion 176. Thus, the lead wire 171 extends from the electrode connecting portion P1 in a direction orthogonal to the sensor section 21 (in the second embodiment, a direction orthogonal to the adhesion surface 22a and toward the front side of the adhesion surface 22a), and then extends toward the first end 21d of the sensor section 21 to be parallel to the sensor section 21. Similarly, the lead wire 172, which configures the other one of the power supply members 130, has the direction changing section 175, which includes the bent portion 176. Thus, the lead wire 172 extends from the electrode connecting portion P1 in a direction orthogonal to the sensor section 21 (in the second embodiment, a direction orthogonal to the adhesion surface 22a and toward the front side of the adhesion surface 22a), and then extends toward the first end 21d of the sensor section 21 to be parallel to the sensor section 21. Thus, even when the lead wires 171, 172 that are drawn out from the sealing member 34 are arranged to extend toward the first end 21d of the sensor section 21 (rightward in FIG. 7(b)), the lead wires 171, 172 do not protrude from the sealing member 34 in the longitudinal direction of the sensor section 21 in the vicinity of the second end 21e of the sensor section 21.

As described above, the second embodiment has the following advantages.

(1) The power supply member 130 that is connected to the electrode wire 23 has the direction changing section 175. The direction changing section 175 extends from the electrode connecting portion P1, which is the connecting portion between the power supply member 130 and the electrode wire 23, in the direction orthogonal to the longitudinal direction of the sensor section 21, and further extends in the direction toward the first end 21d of the sensor section 21. Similarly, the power supply member 130 that is connected to the electrode wire 24 has the direction changing section 175. The direction changing section 175 extends from the electrode connecting portion P1, which is the connecting portion between the power supply member 130 and the electrode wire 24, in the direction orthogonal to the longitudinal direction of the sensor section 21, and further extends in the direction toward the first end 21d of the sensor section 21. That is, immediately after being connected to the electrode wires 23, 24, the power supply members 130 extend in the direction orthogonal to the longitudinal direction of the sensor section 21, and further extend toward the first end 21d of the sensor section 21. Thus, when the power supply members 130 are arranged to extend toward the first end 21d of the sensor section 21 on one longitudinal end of the foreign matter detection, sensor 13 (the end corresponding to the second end 22e), the power supply members 130 are prevented from protruding from the sealing member 34 in the longitudinal direction of the sensor section 21. Furthermore, the measurement of the part of the power supply members 130 that protrude from one longitudinal end (the end closer to the second end 22e) of the hollow insulating body 22 in the longitudinal direction of the sensor section 21 is reduced in the longitudinal direction of the sensor section 21. As a result, the measurement of the sensor section 21 is increased in the longitudinal direction by the amount corresponding to the reduced measurement of the part of the power supply members 130 that protrude from one longitudinal end of the hollow insulating body 22 in the longitudinal direction of the sensor section 21. Also, since the direction changing sections 175 are sealed inside the sealing member 34, the power supply members 130 are prevented from protruding from the sealing member 34 in the longitudinal direction of the sensor section 21. Thus, the longitudinal measurement of the sensor section 21 is prevented from being reduced due to the power supply members 130. Therefore, in each foreign matter detection sensor 13, the detection range of the foreign matter is increased in the longitudinal direction of the sensor section 21.

(2) One of the power supply members 130 is arranged adjacent to the second end 21e of the sensor section 21, and includes one of the terminals 51, to which the electrode wire 23 is electrically connected, and the lead wire 171, which is electrically connected to the terminal 51. The other one of the power supply members 130 is arranged adjacent to the second end 21e of the sensor section 21, and includes the other one of the terminals 51 to which the electrode wire 24 is electrically connected, and the lead wire 172, which is electrically connected to the terminal 51. Thus, since the electrode wires 23, 24 are electrically connected to the terminals 51, the electrode wires 23, 24 and the power supply members 130 are easily connected to each other.

(3) The bent portions 176 are formed by bending the lead wires 171, 172. In this manner, the bent portions 176 are easily formed by bending the lead wires 171, 172.

(4) The mounting leg 182 is reinforced by the power supply members 130 embedded inside the mounting leg 182.

(5) The rear portion of the mounting engagement portions 183 in the mounting leg 182 is a part where load is likely to be applied in the state in which the mounting leg 182 is mounted on the bracket 12. Since the power supply members 130 are embedded in the rear portion of the mounting engagement portions 183 on which load is likely to be applied, the mounting leg 182 is more effectively reinforced.

(6) Parts of the power supply members 130 are embedded in the part of the mounting leg 182 where the recess-like mounting engagement portions 183 are formed and the width of the mounting leg 182 is reduced. Thus, part of the mounting leg 182 where the recess-like mounting engagement portions 183 are formed is further effectively reinforced by the power supply members 130.

The embodiments of the present invention may be modified as follows.

In the first embodiment, the foreign matter detection sensors 13 are adhered to the edges of the door panel 5 (mounting positions) via the brackets 12. However, the foreign matter detection sensors 13 may be adhered directly to the edges of the door panel 5 without using the brackets 12. Also, the foreign matter detection sensors 13 may be mounted on the brackets 12 or the edges of the door panel 5 by method other than adhesion by the double-sided tape 15, such as sticking with an adhesive.

In the first embodiment, the longitudinal direction of the sealing member 34 is a direction orthogonal to the longitudinal direction of the sensor section 21. Part of the sealing member 34 at the front side of the adhesion surface 22a is longer than part of the sealing member 34 at the back side of the adhesion surface 22a. However, the longitudinal direction of the sealing member 34 does not necessarily have to be the direction orthogonal to the longitudinal direction of the sensor section 21. Also, the part of the sealing member 34 at the front side of the adhesion surface 22a does not necessarily have to be longer than the part of the sealing member 34 at the back side of the adhesion surface 22a.

In the first embodiment, parts of the two terminals 33 are embedded in the mounting leg 82 at the back side of the two mounting engagement portions 83. However, the two terminals 33 do not need to be embedded in the mounting leg 82 at the back side of the two mounting engagement portions 83.

In the first embodiment, the mounting leg 82 includes the pair of mounting engagement portions 83. However, the mounting leg 82 may include only one mounting engagement portion 83. Also, the mounting leg 82 does not necessarily have to include the mounting engagement portion 83.

In the first embodiment, parts of the two terminals 33 are embedded inside the mounting leg 82. However, the two terminals 33 do not necessarily have to be embedded in the mounting leg 82.

The sealing member 34 does not necessarily have to include the mounting leg 82 for engaging the sealing member 34 to the bracket 12.

In the first embodiment, the two terminals 33 are arranged adjacent to the second end 22e of the hollow insulating body 22 such that the transverse direction of the terminals 33 corresponds to the longitudinal direction of the sensor section 21, and the longitudinal direction of the terminals 33 is orthogonal to the longitudinal direction of the sensor section 21. However, the two terminals 33 may be arranged adjacent to the second end 22e of the hollow insulating body 22 such that the transverse direction of the terminals 33 is orthogonal to the longitudinal direction of the sensor section 21, and the longitudinal direction of the terminals 33 corresponds to the longitudinal direction of the sensor section 21.

In the first embodiment, the terminals 33 each include the terminal main body 51, which is a rectangular plate having the transverse direction and the longitudinal direction. The terminals 33 are also plates having the transverse direction and the longitudinal direction. However, the shape of the terminals 33 is not limited to this. For example, the electrode wires 23, 24 and the lead wires 71, 72 may be electrically connected to one another by substantially shaped terminals 102 as a foreign matter detection sensor 101 shown in FIGS. 8(a) and 8(b). In FIGS. 8 and 9, like or the same reference numerals are given to those components that are like or the same as the corresponding components of the first embodiment.

A support member 103, which supports the terminals 102, includes a terminal support portion 104, the guide portion 43, and the spacer 42. The terminal support portion 104 has an L-shape like the terminals 102. The two terminals 102 are arranged on the end faces of the terminal support portion 104 in the thickness direction. The terminal support portion 104 supports the two terminals 102 so as to form the double structure in which the two terminals 102 are overlapped with each other in the thickness direction while insulating the two terminals 102 from each other. In a state in which the support member 103 is mounted on the second end 22e of the hollow insulating body 22, the terminals 102 extend in the direction to separate from the second end 22e in the longitudinal direction of the sensor section 21, are bent at right angle toward the adhesion surface 22a, and protrude further outward than the outer circumferential surface of the hollow insulating body 22.

As shown in FIG. 9, on both sides of the terminal support portion 104 in the thickness direction, the terminals 102 and the opposing core electrodes 25 of the electrode wires 23, 24 are electrically connected by welding. On both sides of the terminal support portion 104 in the thickness direction, the terminals 102 and the opposing lead wires 71, 72 are electrically connected by welding. The connecting portions between the terminals 102 and the lead wires 71, 72 are lead wire connecting portions P5. The connecting portions between the terminals 102 and the electrode wires 23, 24 are electrode connecting portions P4. As shown in FIGS. 8(b) and 9, the lead wire connecting portions P5 are displaced relative to the electrode connecting portions P4 on the terminals 102 in the direction orthogonal to the longitudinal direction of the sensor section 21 (arrow C in FIG. 8(b)) so as to approach the draw-out positions P3 at which the lead wires 71, 72 are drawn out from the sealing member 34. Furthermore, the lead wire connecting portions P5 are displaced relative to the electrode connecting portions P4 to a position further from the sensor section 21 than the electrode connecting portions P4 in the longitudinal direction of the sensor section 21. The lead wires 71, 72 extend straight from the lead wire connecting portions P5 to the draw-out positions P3, and are drawn out from the sealing member 34 to be adjacent to the sensor section 21 in the direction orthogonal to the longitudinal direction of the sensor section 21 and to be parallel to the sensor section 21. The case in which the above-described configuration is employed also has advantages that are the same as the advantages (1) to (3), (5) to (7), and (9) to (12) of the first embodiment.

Figure 11:
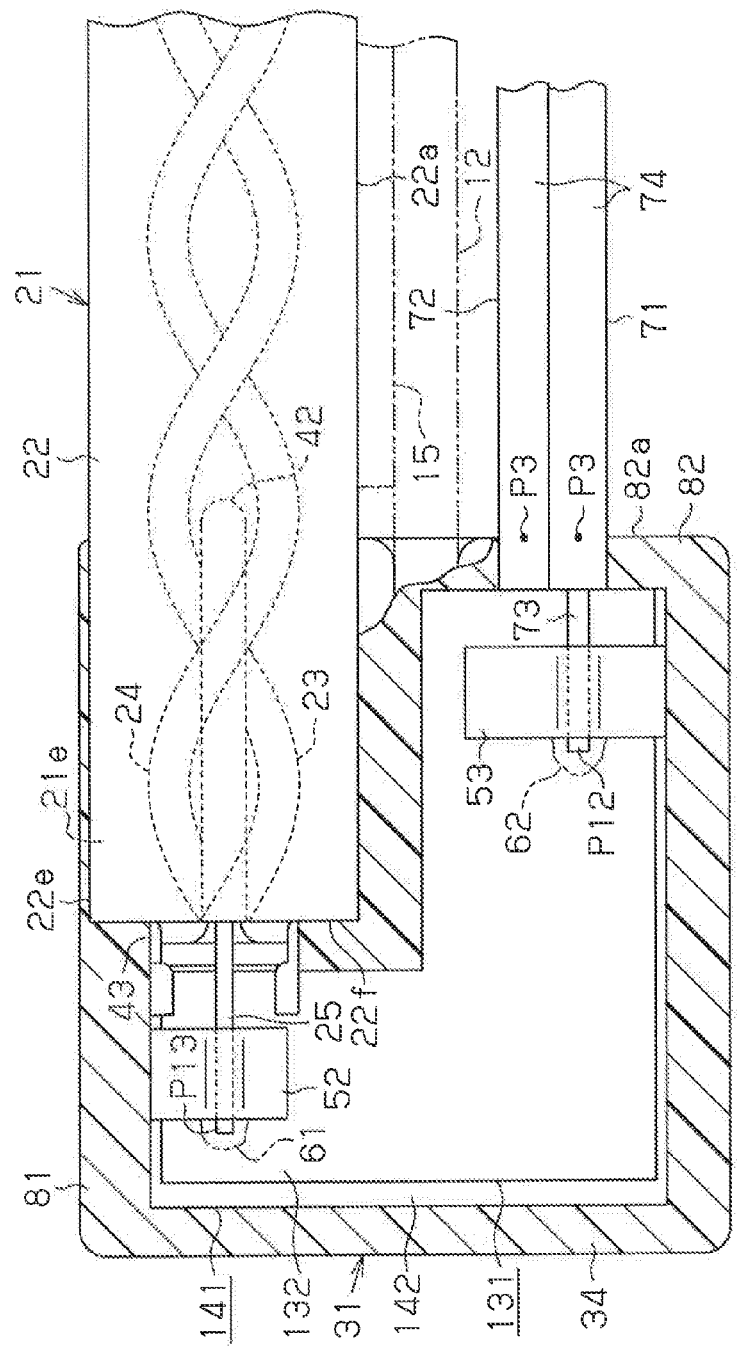
FIG. 11 is a partial cross-sectional view illustrating a foreign matter detection sensor according to another embodiment.

Also, in a case in which the terminals are substantially L-shaped, the configuration as shown in FIG. 11 may be employed. According to the example shown in FIG. 11, terminals 131 each include a substantially L-shaped terminal main body 132 and the first connection piece 52 and the second connection piece 53, which extend from the terminal main body 132. The terminals 131 are supported by a support member 141. The support member 141 includes a terminal support portion 142, which is an L-shaped plate that is similar to the terminal main body 132, the guide portion 43, and the spacer 42. The two terminals 131 are arranged on both end faces of the terminal support portion 142 in the thickness direction. The terminal support portion 142 supports the two terminals 131 so as to form the double structure in which the two terminals 131 are overlapped with each other in the thickness direction while insulating the two terminals 131 from each other. In the state in which the support member 141 is mounted on the second end 22e of the hollow insulating body 22, the terminals 131 extend forward of the adhesion surface 22a in the direction orthogonal to the longitudinal direction of the sensor section 21, and are then bent at right angle to be parallel to the adhesion surface 22a. The first connection piece 52 of each terminal 131 is provided on one end of the terminal main body 132 in the direction orthogonal to the adhesion surface 22a. Furthermore, the second connection piece 53 of each terminal 131 is provided on the other end of the terminal main body 132 in the direction orthogonal to the adhesion surface 22a, that is, on the end opposite to the first connection piece 52. The second connection piece 53 of each terminal 131 is located relative to the first connection piece 52 closer to the first end 21d of the sensor section 21 than the first connection piece 52 in the longitudinal direction of the sensor section 21. After the core electrodes 25 of the electrode wires 23, 24 are each sandwiched between the associated first connection piece 52 and the terminal main body 132 on both sides of the terminal support portion 142 in the thickness direction, the electrode wires 23, 24 are electrically connected to the terminals 131 by soldering. FIG. 11 shows the solder 61, which electrically connects each core electrode 25 to the corresponding terminal 131, by a broken line in which a long dash alternates with a pair of short dashes. After the metal wires 73 of the lead wires 71, 72 are each sandwiched between the associated second connection piece 53 and the terminal main body 132 on both sides of the terminal support portion 142 in the thickness direction, the metal wires 73 are electrically connected to the terminals 131 by soldering. FIG. 11 shows the solder 62, which electrically connects each metal wire 73 to the corresponding terminal 131 by a broken line in which a long dash alternates with a pair of short dashes. The connecting portions between the terminals 131 and the lead wires 71, 72 are lead wire connecting portions P12. The connecting portions between the terminals 131 and the electrode wires 23, 24 are electrode connecting portions P13. The lead wire connecting portions P12 are displaced relative to the electrode connecting portions P13 on the terminals 131 in the direction orthogonal to the longitudinal direction of the sensor section 21 (vertical direction in FIG. 11) so as to approach the draw-out positions P3 at which the lead wires 71, 72 are drawn out from the sealing member 34. The lead wire connecting portions P12 are located relative to the electrode connecting portions P13 to be closer to the first end 21d of the sensor section 21 than the electrode connecting portions P13 in the longitudinal direction of the sensor section 21. The lead wires 71, 72 are drawn out from the sealing member 34 so as to be adjacent to the sensor section 21 in the direction orthogonal to the longitudinal direction of the sensor section 21 and to be parallel to the sensor section 21. In the case in which the above-mentioned configuration is employed, advantages that are the same as the advantages (1) to (3), (5) to (7), and (9) to (12) of the first embodiment are obtained. Furthermore, in this case, the protruding amount of the sealing member 34 from the longitudinal end of the sensor section 21 in the longitudinal direction of the sensor section 21 is reduced as compared to the example shown in FIGS. 8(a) and 8(b). The measurement of the sensor section 21 is increased in the longitudinal direction by the amount corresponding to the reduced protruding amount of the sealing member 34 from the longitudinal end of the sensor section 21 in the longitudinal direction of the sensor section 21. As a result, in the foreign matter detection sensor, the detection range of the foreign matter is further increased in the longitudinal direction of the sensor section 21.

In the first embodiment, the lead wires 71, 72 are drawn out from the sealing member 34 in the vicinity of the longitudinal end of the sensor section 21 close to the terminal processing section 31 so as to be adjacent to the sensor section 21 in the direction orthogonal to the longitudinal direction of the sensor section 21 and to be parallel to the sensor section 21. However, the lead wires 71, 72 may be arranged relative to the terminals 33 in the vicinity of the longitudinal end of the sensor section 21 close to the terminal processing section 31 such that the longitudinal direction of the lead wires 71, 72 and the longitudinal direction of the sensor section 21 form an angle less than or equal to the right angle (that is, 0° to 90°).

In the first embodiment, the two terminals 33 are supported by the support member 32 to form the double structure while being insulated from each other. However, the two terminals 33 do not necessarily have to be overlapped, but may be arranged in a row in the direction orthogonal to the longitudinal direction of the sensor section 21, or in the longitudinal direction of the sensor section 21. For example, a first terminal 111 and a second terminal 112 shown in FIG. 10 are arranged in a row in the longitudinal direction of the sensor section 21 (left and right direction in FIG. 10). The first terminal 111 and the second terminal 112 are supported by a support member 113 formed of insulating plastic material. The support member 113 is a rectangular plate. The support member 113 is arranged adjacent to the other end of the sensor section 21 in the longitudinal direction (the second end 22e of the hollow insulating body 22). The longitudinal direction of the support member 113 is a direction orthogonal to the longitudinal direction of the sensor section 21 (longitudinal direction of the hollow insulating body 22). Part of the support member 113 at the front side of the adhesion surface 22a (below the adhesion surface 22a in FIG. 10) is longer than part of the support member 113 at the back side of the adhesion surface 22a (above the adhesion surface 22a in FIG. 10). In the example shown in FIG. 10, the longitudinal direction of the support member 113 is parallel to the direction orthogonal to the adhesion surface 22a. The first terminal 111 and the second terminal 112 are arranged and secured to the end surface of the support member 113 in the thickness direction. The first terminal 111 and the second terminal 112 are formed of conductive metal plates. The first terminal 111 is a rectangular plate that is smaller than the support member 113, and is arranged at substantially the center portion of the end surface of the support member 113 in the thickness direction. The second terminal 112 is configured by a pair of connecting portions 112a, which is arranged on both sides of the first terminal 111 in the longitudinal direction, and a coupling portion 112b, which connects the connecting portions 112a. The second terminal 112 as viewed from the thickness direction of the support member 113 (in a direction perpendicular to the sheet of FIG. 10) is substantially U-shaped. The connecting portions 112a are rectangular plates, and the coupling portion 112h has an elongated band shape. One of the connecting portions 112a is located on the back side of the adhesion surface 22a, and the other one of the connecting portions 112a is located on the front side of the adhesion surface 22a. The coupling portion 112b is arranged at a position further than the first terminal 111 from the sensor section 21 in the longitudinal direction of the sensor section 21 (the same as the transverse direction of the support member 113). The first terminal 111 and the second terminals 112 as described above are supported by the support member 113 in a state separate from each other.

The core electrode 25 of the electrode wire 24 that is drawn out from the second end 22e of the hollow insulating body 22 and the metal wire 73 that is exposed at the distal end of the lead wire 72 are connected to the first terminal 111. Weld beads 114 are formed on the distal end of the core electrode 25 of the electrode wire 24 drawn out from the second end 22e and the distal end of the metal wire 73 exposed at the distal end of the lead wire 72 by arc welding for example, TIG welding). The core electrode 25 of the electrode wire 24 drawn out from the second end 22e and the metal wire 73 exposed at the distal end of the lead wire 72 are electrically and mechanically connected to the first terminal 111 by connecting the weld beads 114 to the first terminal 111 by resistance welding. A lead wire connecting portion PG of the first terminal 111 to which the lead wire 72 is connected is located at the position displaced from an electrode connecting portion P7 of the first terminal 111 to which the electrode wire 24 is connected in the direction orthogonal to the longitudinal direction of the sensor section 21, and at the position on the front side of the adhesion surface 22a.

The core electrode 25 of the electrode wire 23 drawn out from the second end 22e of the hollow insulating body 22, and the metal wire 73 exposed at the distal end of the lead wire 71 are connected to the second terminal 112. Weld beads 114 are formed on the distal end of the core electrode 25 of the electrode wire 23 drawn out from the second end 22e and on the distal end of the metal wire 73 exposed at the distal end of the lead wire 71 by arc welding (for example, TIG welding). The core electrode 25 of the electrode wire 23 drawn out from the second end 22e is electrically and mechanically connected to the second terminal 112 by connecting the weld bead 114 of the core electrode 25 to one of the connecting portions 112a located on the back side of the adhesion surface 22a by resistance welding. The metal wire 73 exposed at the distal end of the lead wire 71 is electrically and mechanically secured to the second terminal 112 by connecting the weld bead 114 of the metal wire 73 to the other one of the connecting portions 112a arranged on the front side of the adhesion surface 22a by resistance welding. A lead wire connecting portion P8 of the second terminal 112 to which the lead wire 71 is connected is provided at a position displaced from an electrode connecting portion P9 of the second terminal 112 to which the electrode wire 23 is connected in a direction orthogonal to the longitudinal direction of the sensor section 21, and at a position on the front side of the adhesion surface 22a.

In the example shown in FIG. 10, the lead wires 71, 72 are arranged relative to the first terminal 111 and the second terminal 112 such that the longitudinal direction of the lead wires 71, 72 forms an angle of 0° with the longitudinal direction of the sensor section 21. That is, the lead wires 71, 72 are arranged to be parallel to the sensor section 21. Also, in FIG. 10, illustration of the sealing member 34, which embeds the first terminal 111, the second terminal 112, and the support member 113, is omitted. In the case in which the above configuration is employed, the same advantages as the advantages (1) and (3) to (12) of the first embodiment are obtained.

In the case in which the terminals 33 can be supported by the sealing member 34, the foreign matter detection sensor 13 does not necessarily have to include the support member 32.

The number of the terminals 33 provided, in the foreign matter detection sensor 13 may be changed in accordance with the number of the electrode wires 23, 24. For example, in a case in which three or more terminals 33 are provided in the foreign matter detection sensor 13, the support member may support the terminals 33 to form a multilayer structure or the terminals 33 may be arranged in a row while the support member insulates the terminals 33 from one another. As long as the terminals 33 are insulated from one another, the foreign matter detection sensor 13 does not necessarily have to include the support member for supporting the terminals 33.

In the first embodiment, after being sandwiched between the first connection piece 52 and the terminal main body 51, each of the electrode wires 23, 24 is electrically connected to the associated terminal 33 by soldering. After being sandwiched between the second connection piece 53 and the terminal main body 51, each of the lead wires 71, 72 is electrically connected to the associated terminal 33 by soldering. However, each of the electrode wires 23, 24 does not need to be soldered, but may be electrically connected to the corresponding terminal 33 by only being sandwiched and crimped, between the associated first connection piece 52 and the terminal main body 51. Similarly, each of the lead wires 71, 72 does not need to be soldered, but may be electrically connected to the corresponding terminal 33 by only being sandwiched and crimped between the associated second connection piece 53 and the terminal main body 51. Also, the electrode wires 23, 24 and the lead wires 71, 72 may be electrically connected to the terminals 33 by welding. For example, in the example shown in FIGS. 12(*a*) and 12(*b*), terminals 121 do not include the first connection pieces 52 and the second connection pieces 53, and have a rectangular plate-like shape. That is, the terminals 121 are plates having the transverse direction and the longitudinal direction. The terminals 121 are secured to both sides of the terminal support portion 41 in the thickness direction, and the two terminals 121, which are insulated from each other and supported by the terminal support portion 41, are arranged adjacent to the longitudinal end of the sensor section 21 (the end close to the second end 22e) such that the transverse direction of the terminals 121 corresponds to the longitudinal direction of the sensor section 21. The weld beads 114 are formed on the distal ends of the core electrodes 25 of the electrode wires 23, 24 drawn out from the second end 22e and the distal ends of the metal wires 73 exposed at the distal ends of the lead wires 71, 72 by arc welding (for example, TIG welding). The core electrodes 25 of the electrode wires 23, 24 drawn out from the second end 22e and the metal wires 73 exposed at the distal ends of the lead wires 71, 72 are electrically and mechanically secured to the terminals 121 by connecting the weld beads 114 to the terminals 121 by resistance welding. Lead wire connecting portions P10 of the terminals 121 to which the lead wires 71, 72 are connected are located at positions displaced from electrode connecting portions P11 of the terminals 121 to which the electrode wires 23, 24 are connected in a direction orthogonal to the longitudinal direction (left and right direction in FIG. 12(*b*)) of the sensor section 21, and are located at positions on the front side of the adhesion surface 22a. In a case in which the above configuration is employed, advantages that are the same as the advantages (1) to (12) of the first embodiment are obtained.

In the first embodiment, the spacer 42 is cylindrical. However, as long as the spacer 42 is columnar, the spacer 42 does not necessarily have to be cylindrical. For example, the spacer 42 may be a polygonal column.

The shape of the sealing member 34 is not limited to the one illustrated in the first embodiment. The sealing member 34 may have any shape as long as the sealing member 34 seals the terminals 33, the lead wire connecting portions P2, and the electrode connecting portions P1. For example, the sealing member 34 may be a cover attached to the outer circumference of the support member 32 so as to accommodate the terminals 33, the lead wire connecting portions P2, and the electrode connecting portions P1.

According to the foreign matter detection sensor 13 of the first embodiment, the longitudinal end of the sensor section 21 close to the first end 22d may be configured as shown in FIGS. 13(a) and 13(h). In FIGS. 13(a) and 13(b), like or the same reference numerals are given to those components that are like or the same as the corresponding components of the first embodiment. An element-side terminal 151 is provided on the first end 22d of the hollow insulating body 22. The element-side terminal 151 includes the support member 32, which is arranged to be adjacent to the first end 22d of the hollow insulating body 22, and two element connecting terminals 152, which are supported by the support member 32, a resistive element 153, and an element-side sealing member 154, which embeds and seals the support member 32 and the resistive element 153.

The element connecting terminals 152 have the same shape as the terminals 33 of the first embodiment, and are each configured by the terminal main body 51, the first connection piece 52, and the second connection piece 53. Thus, the element connecting terminals 152 are plates having the transverse direction and the longitudinal direction. The two element connecting terminals 152 are arranged on both end faces of the terminal support portion 41. The terminal support portion 41 supports the two element connecting terminals 152 so as to form the double structure in which the element connecting terminals 152 overlap each other while insulating the two element connecting terminals 152. The support member 32 is mounted on the hollow insulating body 22 by inserting the spacer 42 in the hollow bore 22b from the first end 22d. The terminal support portion 41 of the support member 32 is arranged relative to the sensor section 21 such that the thickness direction of the terminal support portion 41 is parallel to the widthwise direction of the adhesion surface 22a. The terminal support portion 41 is adjacent to the widthwise center portion of the adhesion surface 22a in the longitudinal direction of the sensor section 21 (arrow B in FIG. 13(b)). The longitudinal end of the terminal support portion 41 opposite to where the guide portion 43 is provided (that is, the longitudinal end on which the second connection pieces 53 are arranged) protrudes from the adhesion surface 22a toward the outer circumference of the hollow insulating body 22, which is the front side of the adhesion surface 22a (below the adhesion surface 22a in FIG. 13(b)). The longitudinal direction of the terminal support portion 41 is a direction orthogonal to the longitudinal direction of the sensor section 21, and more specifically, is a direction orthogonal to the adhesion surface 22a (arrow C in FIG. 13(b)). Part of the terminal support portion 41 at the front side of the adhesion surface 22a is longer than the part of the terminal support portion 41 at the back side of the adhesion surface 22a. Thus, the two element connecting terminals 152 supported on the terminal support portion 41 are arranged adjacent to the first end 22d of the hollow insulating body 22 such that the transverse direction of the element connecting terminals 152 corresponds to the longitudinal direction of the sensor section 21, and the longitudinal direction of the element connecting terminals 152 is orthogonal to the longitudinal direction of the sensor section 21. That is, the two element connecting terminals 152 are arranged to be adjacent to one of the longitudinal ends of the sensor section 21 opposite to the end on which the terminals 33 (see FIG. 5(b)) are arranged, that is, the first end 21d. The longitudinal direction of the element connecting terminals 152 is a direction orthogonal to the longitudinal direction of the sensor section 21 (in this example, the direction orthogonal to the adhesion surface 22a). Part of the element connecting terminals 152 on the front side of the adhesion surface 22a is longer than part of the element connecting terminals 152 on the back side of the adhesion surface 22a.

The core electrodes 25 of the electrode wires 23, 24 are drawn out from the first end 22d of the hollow insulating body 22. The core electrodes 25 of the two electrode wires 23, 24 drawn out from the first end 22d of the hollow insulating body 22 are arranged on both sides of the terminal support portion 41 in the thickness direction. After the core electrodes 25 of the electrode wires 23, 24 are each sandwiched between the associated first connection piece 52 and the terminal main body 51 on both sides of the terminal support portion 41 in the thickness direction, the core electrodes 25 are electrically connected to the element connecting terminals 152 by soldering. In FIG. 13(h), a solder 161, which electrically connects each core electrode 25 to the associated element connecting terminal 152 is shown by a broken line in which a long dash alternates with a pair of short dashes. The connecting portions between the element connecting terminals 152 and the core electrodes 25 of the electrode wires 23, 24, which are element-side electrode connecting portions P14, are formed on the ends of the element connecting terminals 152 that are adjacent to the first end 21d of the sensor section 21 (the end close to the first end 22d) in the longitudinal direction of the sensor section 21.

The resistive element 153 includes a pair of connecting legs 153a for connecting the resistive element 153 to the element connecting terminals 152. FIG. 13(b) shows only one of the pair of connecting legs 153a. The resistive element 153 is arranged at a position closer to the sensor section 21 than one of the transverse ends of each element connecting terminal 152 opposite to the sensor section 21 (the left end in FIG. 13(b)). In this example, part of the resistive element 153 other than the connecting legs 153a is arranged to be closer to the sensor section 21 than the element connecting terminals 152. The pair of connecting legs 153a is arranged on both sides of the terminal support portion 41 in the thickness direction such that the terminal support portion 41 is located, in between. After the pair of connecting legs 153a is each sandwiched between the associated second connection piece 53 and the terminal main body 51 on both sides of the terminal support portion 41 in the thickness direction, the connecting legs 153a are electrically connected to the element connecting terminals 152 by soldering. In FIG. 13(b), a solder 162, which electrically connects each connecting leg 153a to the associated element connecting terminal 152, is shown by a broken line in which a long dash alternates with a pair of short dashes. The connecting portions between the element connecting terminals 152 and the resistive element 153, which are element connecting portions P15, are formed at positions on the element connecting terminals 152 displaced from the element-side electrode connecting portions P14 in a direction orthogonal to the longitudinal direction of the sensor section 21 toward the outer circumference of the hollow insulating body 22. The element connecting portions P15 are formed on the longitudinal ends opposite to the ends of the element connecting terminals 152 on which the element-side electrode connecting portions P14 are provided, and are formed at positions on the element connecting terminals 152 at the front side of the adhesion surface 22a.

The element-side sealing member 154 is formed of insulating plastic material. The element-side sealing member 154 embeds and seals the element connecting terminals 152, the resistive element 153, the element connecting portions P15, the element-side electrode connecting portions P14, and the first end 22d of the hollow insulating body 22 adjacent to the element connecting terminals 152. The element-side sealing member 154 includes an element-side terminal, coating section 171, which is adjacent to the first end 22d of the hollow insulating body 22 in the longitudinal direction of the sensor section 21, and an element-side mounting leg 172, which is integrally formed with the element-side terminal coating section 171.

The element-side terminal coating section 171 is integrally formed on the end face of the hollow insulating body 22 at the first end 22d while embedding the first end 22d of the hollow insulating body 22. The element-side terminal coating section 171 embeds and seals part of the terminal support portion 41 adjacent to the first end 22d of the hollow insulating body 22 in the longitudinal direction of the sensor section 21, part of the two element connecting terminals 152 adjacent to the first end 22d of the hollow insulating body 22 in the longitudinal direction of the sensor section 21 (approximately half the element connecting terminals 152 in the longitudinal direction where the electrode wires 23, 24 are connected), the guide portion 43, and the element-side electrode connecting portions P14. The outer shape of the element-side terminal coating section 171 is a size larger than the outer shape of the hollow insulating body 22, and the shape of the cross-section of the element-side terminal coating section 171 orthogonal to the longitudinal direction of the sensor section 21 is substantially D-shaped. The end of the element-side terminal coating section 171 close to the first end 22d of the hollow insulating body 22 is in close contact with the first end 22d to be liquid-tight and air-tight.

The element-side mounting leg 172 is integrally formed with the end of the element-side terminal coating section 171 closer to the resistive element 153 and with the adhesion surface 22a at the first end 22d of the hollow insulating body 22. The element-side mounting leg 172 protrudes further outward than the outer circumferential surface of the hollow insulating body 22, and is a substantially rectangular solid. The element-side mounting leg 172 has a width slightly greater than the adhesion surface 22a. The measurement of the element-side mounting leg 172 in the longitudinal direction of the sensor section 21 is substantially equal to the measurement of the element-side terminal coating section 171 in the longitudinal direction of the sensor section 21. The element-side mounting leg 172 embeds and seals part of the terminal support portion 41 that protrudes further outward than the outer circumferential surface of the hollow insulating body 22, parts of the two element connecting terminals 152 that protrude further outward than the outer circumferential surface of the hollow insulating body 22 (approximately half the element connecting terminals 152 in the longitudinal direction where the resistive element 153 is connected), the resistive element 153, and the element connecting portions P15. Thus, the longitudinal direction of the element-side sealing member 154 is a direction orthogonal to the longitudinal direction of the sensor section 21 (in this embodiment, the direction orthogonal to the adhesion surface 22a). Part of the element-side sealing member 154 at the front side of the adhesion surface 22a is longer than part of the element-side sealing member 154 at the back side of the adhesion surface 22a.

A pair of element-side mounting engagement portions 173 are formed on the element-side mounting leg 172. FIG. 13(b) shows only one of the two element-side mounting engagement portions 173. The pair of element-side mounting engagement portions 173 are formed on both sides of the element-side mounting leg 172 in the widthwise direction (the direction that is the same as the widthwise direction of the adhesion surface 22a), that is, on both sides of the element-side mounting leg 172 in the thickness direction of the terminal support portion 41. The pair of element-side mounting engagement portions 173 are grooves extending in the longitudinal direction of the sensor section 21 through the element-side mounting leg 172 in the longitudinal direction of the sensor section 21. The pair of element-side mounting engagement portions 173 is formed at positions between the element-side electrode connecting portions P14 and the element connecting portions P15 in the longitudinal direction of the terminal support portion 41. The pair of element-side mounting engagement portions 173 is formed at positions on the element connecting terminals 152 between the first connection pieces 52 and the second connection pieces 53 in the longitudinal direction of the terminal support portion 41. The width of part of the element-side mounting leg 172 at which the pair of element-side mounting engagement portions 173 are formed (the width in the direction that is the same as the widthwise direction of the adhesion surface 22a) is reduced. However, parts of the two element connecting terminals 152 are embedded in the element-side mounting leg 172 at the back side of the element-side mounting engagement portions 173.

The above-mentioned element-side mounting leg 172 is engaged with the bracket 12 by inserting the part of the element-side mounting leg 172 between the pair of element-side mounting engagement portions 173 in the engaging groove 12a formed in the longitudinal end of the bracket 12. Parts on both sides of the engaging groove 12a of the bracket 12 are inserted in the pair of element-side mounting engagement portions 173. Thus, the longitudinal end of the foreign matter detection sensor 13 close to the element-side sealing member 154 is secured to the bracket 12 by the element-side mounting leg 172.

In this manner, since the element connecting portions P15 are displaced relative to the element-side electrode connecting portions P14 on the element connecting terminals 152 in the direction orthogonal to the longitudinal direction of the sensor section 21, the resistive element 153 is easily arranged at a position closer to the sensor section 21 than the one of the transverse ends of each element connecting terminal 152 opposite to the sensor section 21. Since the resistive element 153 is arranged at the position closer to the sensor section 21 than one of the transverse ends of each element connecting terminal 152 opposite to the sensor section 21, the site of the element-side sealing member 154 is reduced in the longitudinal direction of the sensor section 21 as compared to a case in which the resistive element 153 is arranged to protrude from the element connecting terminals 152 in the direction opposite to the sensor section 21 in the longitudinal direction of the sensor section 21. Thus, the measurement of the sensor section 21 is increased in the longitudinal direction on the longitudinal end of the sensor section 21 at which the element connecting terminals 152 are arranged. As a result, the detection range of the foreign matter is increased in the longitudinal direction of the sensor section 21.

In the example shown in FIG. 13, after being sandwiched between the first connection piece 52 and the terminal main body 51, each of the electrode wires 23, 24 is electrically connected to the associated element connecting terminal 152 by soldering. After being sandwiched between the second connection piece 53 and the terminal main body 51, each of the connecting legs 153a of the resistive element 153 is electrically connected to the associated element connecting terminal 152 by soldering. However, each of the electrode wires 23, 24 does not need to be soldered, but may be electrically connected to the corresponding element connecting terminal 152 by only being sandwiched and crimped between the associated first connection piece 52 and the terminal main body 51. Similarly, each of the connecting legs 153a of the resistive element 153 does not need to be soldered, but may be electrically connected to the corresponding element connecting terminal 152 by being sandwiched and crimped between the associated second connection piece 53 and the terminal main body 51. Also, the electrode wires 23, 24 and the resistive element 153 may be electrically connected to the element connecting terminals 152 by welding.

In the first embodiment, the sensor section 21 includes the two electrode wires 23, 24. However, the number of the electrode wires of the sensor section 21 is not limited to two but may be any number more than one.

In the first embodiment, the electrode wires 23, 24 helically extend in the longitudinal direction of the hollow insulating body 22. However, the electrode wires 23, 24 may extend straight in the longitudinal direction of the hollow insulating body 22.

In the first embodiment, the electrode wires 23, 24 each include the flexible core electrode 25, which is formed by twisting conductive thin wire, and the cylindrical conductive coating layer 26, which has conductivity and elasticity and covers the outer circumference of the core electrode 25. However, each of the electrode wires 23, 24 may be a single flexible metal wire.

In the first embodiment, the foreign matter detection sensors 13 are arranged on the edges of the door panel 5 (mounting positions). However, the foreign matter detection sensors 13 may be arranged on the edges (mounting position) of the tail opening 4 opposing the edges of the door panel 5. Also, the foreign matter detection sensors 13 do not necessarily have to be used in the foreign matter detection apparatus 11 of the motor-driven back door device 2, but may be used in a foreign matter detection apparatus of a motor-driven slide door device that selectively opens and closes the exit provided on a side of the vehicle by sliding a door panel. Also, the foreign matter detection sensor 13 may be used in an apparatus for detecting contact of foreign matter besides the foreign matter detection apparatus of a door opening and closing apparatus that selectively opens and closes the door panel by driving force of, for example, a motor.

In the second embodiment, the mounting engagement portions 183 are recesses that are formed to reduce the width of the mounting leg 182. However, the shape of the mounting engagement portions 183 is not limited to this. For example, the mounting engagement portions 183 may protrude in the widthwise direction of the mounting leg 182. In this case, the longitudinal end of each bracket 12 has a shape that can be engaged with the mounting engagement portions 183.

In the second embodiment, parts of the power supply members 130 are located at the rear portion of the mounting engagement portions 183 in the mounting leg 182. However, parts of the power supply members 130 embedded in the mounting leg 182 do not necessarily have to be located at the rear portion of the mounting engagement portions 183.

In the second embodiment, the mounting leg 182 includes the pair of mounting engagement portions 183. However, the mounting leg 182 may include only one mounting engagement portion 183. Also, the mounting leg 182 does not necessarily have to include the mounting engagement portion 183.

In the second embodiment, part of the sealing member 34 that protrude further outward than the outer circumferential surface of the hollow insulating body 22 forms the mounting leg 182 mounted on the bracket 12. However, part of the sealing member 34 that protrudes further outward than the outer circumferential surface of the hollow insulating body 22 (the part that protrudes forward of the adhesion surface 22a) does not necessarily have to be mounted on the bracket 12.

In the second embodiment, the foreign matter detection sensors 13 are adhered to the edges (mounting positions) of the door panel 5 via the brackets 12. However, the foreign matter detection sensors 13 may be adhered directly to the edges of the door panel 5 without using the brackets 12. Also, the foreign matter detection sensors 13 may be mounted on the brackets 12 or the edges of the door panel 5 by method other than adhesion by the double-sided tape 15, such as sticking with an adhesive.

In the second embodiment, the lead wires 171, 172 are connected to the positions on the terminals 51 that are the same as the positions where the core electrodes 25 of the electrode wires 23, 24 are connected. However, the lead wires 171, 172 may be connected to positions on the terminals 51 displaced in the longitudinal direction of the sensor section 21 from the positions where the core electrodes 25 of the electrode wires 23, 24 are connected.

In the second embodiment, one of the power supply members 130 is configured by one of the terminals 51 and one of the lead wires (the lead wire 171), but may be formed of only the lead wire 171. Similarly, the other one of the power supply members 130 is configured by the other one of the terminals 51 and the other one of the lead wires (the lead wire 172), but may be configured by only the lead wire 172. In this case, the distal end of the core electrode 25 of the electrode wire 23 is electrically connected to the distal end of the metal wire 173 of the lead wire 171 directly, and the distal end of the core electrode 25 of the electrode wire 24 is electrically connected to the distal end of the metal wire 173 of the lead wire 172 directly. Thus, the terminal processing section 31 does not include the support member 32 and the terminals 51. Since the number of components of the foreign matter detection sensor 13 is reduced, the manufacturing costs are reduced.

In the second embodiment, the bent portions 176 are bent such that, parts of the power supply members 130 on the opposite side of the bent portions 176 relative to the electrode connecting portions P1 extend toward the first end 22d of the hollow insulating body 22 in parallel to the sensor section 21. However, the bent portions 176 may have any shape as long as the direction in which the parts of the power supply members 130 on the opposite side of the bent portions 176 relative to the electrode connecting portions P1 extend is in the direction toward the first end of the sensor section 21.

In the second embodiment, the direction changing sections 175 include the bent portions 176, but do not necessarily have to include the bent portions 176. In this case, the direction changing sections 175 may extend straight from the electrode connecting portions P1 to the end face 182a of the mounting leg 182 inside the sealing member 34 such that, for example, the direction changing sections 175 extend from the electrode connecting portions P1 in a direction intersecting the longitudinal direction of the sensor section 21 and further extend in the direction toward the first end 21d (first end 22d) of the sensor section 21.

In the second embodiment, the direction changing sections 175 extend from the electrode connecting portions P1 in the direction orthogonal to the longitudinal direction of the sensor section 21, and further extend toward the first end 22d of the hollow insulating body 22 to be parallel to the sensor section 21. However, the direction in which the direction changing sections 175 extend is not limited to this. The direction changing sections 175 may have any form as long as the direction changing sections 175 extend from the electrode connecting portions P1 in the direction intersecting the longitudinal direction of the sensor section 21 and further extend in the direction toward the first end 21*d* of the sensor section 21. In this case also, an advantage that is the same as the advantage (1) of the second embodiment is obtained.

In the second embodiment, parts of the insulating coatings 174 of the lead wires 171, 172 are embedded in the sealing member 34. However, the parts of the insulating coatings 174 do not need to be embedded in the sealing member 34, and only the metal wires 173 may be embedded in the sealing member 34. The insulating coatings 174 are generally formed of plastic material. Therefore, since the parts of the insulating coatings 174 are embedded in the sealing member 34 formed of plastic material, for example, even in a case in which the terminal processing section 31 is exposed to a high temperature and the plastic material expands, the sealing performance between the sealing member 34 and the lead wires 171, 172 is prevented from being reduced due to the difference in the coefficient of linear expansion (coefficient of cubic expansion). The number of the power supply members 130 provided in the foreign matter detection sensor 13 may be changed as required in accordance with the number of electrode wires 23, 24.

The shape of the sealing member 34 is not limited to that illustrated in the second embodiment. The sealing member 34 may have any shape as long as the sealing member 34 seals the electrode connecting portions P1, the direction changing sections 175, the bent portions 176, and one longitudinal end of the hollow insulating body 22. For example, the sealing member 34 may be a cover that is mounted on the outer circumference of the support member 32 so as to accommodate the electrode connecting portions P1, the direction changing sections 175, the bent portions 176, and one longitudinal end of the hollow insulating body 22.

In the second embodiment, the straight line L1 that passes through the centers of the electrode wires 23, 24 is parallel to the widthwise direction of the adhesion surface 22*a*. However, the straight line L1 does not necessarily have to be parallel to the widthwise direction of the adhesion surface 22*a*. For example, the straight line L1 may be parallel to the direction orthogonal to the longitudinal direction of the sensor section 21. That is, the electrode wires 23, 24 may be drawn out from the second end 22*e* of the hollow insulating body 22 such that the straight line L1 is parallel to the direction orthogonal to the longitudinal direction of the sensor section 21 on the end face 22*f*.

In the second embodiment, the sensor section 21 includes the two electrode wires 23, 24. However, the number of the electrode wires of the sensor section 21 is not limited to two but may be any number more than one.

In the second embodiment, the electrode wires 23, 24 helically extend in the longitudinal direction of the hollow insulating body 22. However, the electrode wires 23, 24 may extend straight in the longitudinal direction of the hollow insulating body 22.

In the second embodiment, each of the electrode wires 23, 24 includes the flexible core electrode 25, which is formed by twisting conductive thin wire, and the cylindrical conductive coating layer 26, which has elasticity and covers the outer circumference of the core electrode 25. However, each of the electrode wires 23, 24 may be a single flexible metal wire.

In the second embodiment, the foreign matter detection sensors 13 are arranged on the edges (mounting positions) of the door panel 5. However, the foreign matter detection sensors 13 may be arranged on the edges (mounting positions) of the tail opening 4 opposing the edges of the door panel 5. Also, the foreign matter detection sensors 13 do not necessarily have to be used in the foreign matter detection apparatus 11 of the motor-driven back door device 2, but may be used in a foreign matter detection apparatus of a motor-driven slide door device that selectively opens and closes the exit provided on a side of the vehicle by sliding a door panel. Also, the foreign matter detection sensor 13 may be used in an apparatus for detecting contact of foreign matter besides the foreign matter detection apparatus of a door opening and closing apparatus that selectively opens and closes the door panel by driving force of, for example, a motor.

The invention claimed is:

1. A foreign matter detection sensor comprising:

an elongated sensor section, which includes an elongated elastic hollow insulating body and a plurality of electrode wires arranged inside the hollow insulating body to be separate from each other, wherein the sensor section includes a first end and a second end in a longitudinal direction, and the sensor section detects foreign matter by receiving external force from the foreign matter and being elastically deformed;

power supply members, which are electrically connected to the electrode wires drawn out from the hollow insulating body at the second end of the sensor section via electrode connecting portions, wherein each power supply member includes a direction changing section, which extends from the associated electrode connecting portion in a direction intersecting the longitudinal direction of the sensor section and further extends in a direction toward the first end of the sensor section; and a sealing member, which is provided on the second end of the sensor section, wherein the sealing member incorporates and seals the electrode connecting portions, the direction changing sections, and one longitudinal end of the hollow insulating body corresponding to the second end of the sensor section;

wherein the power supply members are each formed by a terminal and a lead wire, the terminals are arranged to be adjacent to the second end of the sensor section electrically connected to the electrode wires, and the lead wires are electrically connected to the terminals, and wherein:

the sealing member incorporates and seals the terminals, lead wire connecting portions, which connect the terminals to the lead wires, the electrode connecting portions, and one longitudinal end of the hollow insulating body corresponding to the second end of the sensor section, the lead wires are arranged relative to the terminals such that the angle formed by the longitudinal direction of the lead wires and the longitudinal direction of the sensor section is less than or equal to a right angle, and the lead wire connecting portions are displaced relative to the electrode connecting portions in a direction orthogonal to the longitudinal direction of the sensor section on the terminals to approach draw-out positions at which the lead wires are drawn out from the sealing member.

2. A foreign matter detection sensor comprising:

an elongated sensor section, which includes an elongated elastic hollow insulating body and a plurality of electrode wires arranged inside the hollow insulating body to be separate from each other, wherein the sensor section includes a first end and a second end in a longitudinal direction, and the sensor section detects foreign matter by receiving external force from the foreign matter and being elastically deformed;

power supply members, which are electrically connected to the electrode wires drawn out from the hollow insulating body at the second end of the sensor section via electrode connecting portions, wherein each power supply member includes a direction changing section, which extends from the associated electrode connecting portion in a direction intersecting the longitudinal direction of the sensor section and further extends in a direction toward the first end of the sensor section; and a sealing member, which is provided on the second end of the sensor section, wherein the sealing member incorporates and seals the electrode connecting portions, the direction changing sections, and one longitudinal end of the hollow insulating body corresponding to the second end of the sensor section;

wherein the power supply members are each formed by a terminal and a lead wire, wherein the terminals are arranged to be adjacent to the second end of the sensor section electrically connected to the electrode wires, and the lead wires are electrically connected to the terminals, and wherein the lead wires extend linearly from the lead wire connecting portions to draw-out positions at which the lead wires are drawn out from the sealing member to be adjacent to the sensor section in the direction orthogonal to a longitudinal direction of the sensor section and to be parallel to the sensor section.

3. A foreign matter detection sensor comprising:

an elongated sensor section, which includes an elongated elastic hollow insulating body and a plurality of electrode wires arranged inside the hollow insulating body to be separate from each other, wherein the sensor section includes a first end and a second end in a longitudinal direction, and the sensor section detects foreign matter by receiving external force from the foreign matter and being elastically deformed;

power supply members, which are electrically connected to the electrode wires drawn out from the hollow insulating body at the second end of the sensor section via electrode connecting portions, wherein each power supply member includes a direction changing section, which extends from the associated electrode connecting portion in a direction intersecting the longitudinal direction of the sensor section and further extends in a direction toward the first end of the sensor section; and a sealing member, which is provided on the second end of the sensor section, wherein the sealing member incorporates and seals the electrode connecting portions, the direction changing sections, and one longitudinal end of the hollow insulating body corresponding to the second end of the sensor section;

wherein the power supply members are each formed by a terminal and a lead wire, the terminals are arranged to be adjacent to the second end of the sensor section electrically connected to the electrode wires, and the lead wires are electrically connected to the terminals, and wherein the terminals are plates having a transverse direction and a longitudinal direction, and the terminals are arranged adjacent to the second end of the sensor section such that the transverse direction of the terminals corresponds to the longitudinal direction of the sensor section.

4. A foreign matter detection sensor comprising:

an elongated sensor section, which includes an elongated elastic hollow insulating body and a plurality of electrode wires arranged inside the hollow insulating body to be separate from each other, wherein the sensor section includes a first end and a second end in a longitudinal direction, and the sensor section detects foreign matter by receiving external force from the foreign matter and being elastically deformed;

power supply members, which are electrically connected to the electrode wires drawn out from the hollow insulating body at the second end of the sensor section via electrode connecting portions, wherein each power supply member includes a direction changing section, which extends from the associated electrode connecting portion in a direction intersecting the longitudinal direction of the sensor section and further extends in a direction toward the first end of the sensor section; and a sealing member, which is provided on the second end of the sensor section, wherein the sealing member incorporates and seals the electrode connecting portions, the direction changing sections, and one longitudinal end of the hollow insulating body corresponding to the second end of the sensor section;

wherein:

the sealing member includes a mounting leg, which protrudes further outward than the outer circumferential surface of the hollow insulating body and is adapted to be mounted on a bracket, the bracket is used to mount the sensor section to a mounting position, and parts of the power supply members are embedded in the mounting leg.

5. The foreign matter detection sensor according to claim 4, wherein:

the mounting leg includes a mounting engagement portion to be engaged with the bracket, and parts of the power supply members are embedded in the mounting leg at the back side of the mounting engagement portion.

6. The foreign matter detection sensor according to claim 5, wherein the mounting engagement portion is a recess formed to reduce the width of the mounting leg.

7. A foreign matter detection sensor comprising:

an elongated sensor section, which includes an elongated elastic hollow insulating body and a plurality of electrode wires arranged inside the hollow insulating body to be separate from each other, wherein the sensor section includes a first end and a second end in a longitudinal direction, and the sensor section detects foreign matter by receiving external force from the foreign matter and being elastically deformed;

power supply members, which are electrically connected to the electrode wires drawn out from the hollow insulating body at the second end of the sensor section via electrode connecting portions, wherein each power supply member includes a direction changing section, which extends from the associated electrode connecting portion in a direction intersecting the longitudinal direction of the sensor section and further extends in a direction toward the first end of the sensor section; and a sealing member, which is provided on the second end of the sensor section, wherein the sealing member incorporates and seals the electrode connecting portions, the direction changing sections, and one longitudinal end of the hollow insulating body corresponding to the second end of the sensor section;

wherein an adhesion surface, which extends in the longitudinal direction of the hollow insulating body, is provided on the outer circumferential surface of the hollow insulating body, the adhesion surface being used to adhere and secure the hollow insulating body to a bracket for mounting the sensor section to a mounting position or to the mounting position, and the longitudinal direction of the sealing member is a direction orthogonal to the longitudinal direction of the sensor section, and part of the sealing member at the front side of the adhesion surface is longer than part of the sealing member at the back side of the adhesion surface.

8. A foreign matter detection sensor comprising:
an elongated sensor section, which includes an elongated elastic hollow insulating body and a plurality of electrode wires arranged inside the hollow insulating body to be separate from each other, wherein the sensor section includes a first end and a second end in a longitudinal direction, and the sensor section detects foreign matter by receiving external force from the foreign matter and being elastically deformed;
power supply members, which are electrically connected to the electrode wires drawn out from the hollow insulating body at the second end of the sensor section via electrode connecting portions, wherein each power supply member includes a direction changing section, which extends from the associated electrode connecting portion in a direction intersecting the longitudinal direction of the sensor section and further extends in a direction toward the first end of the sensor section; and
a sealing member, which is provided on the second end of the sensor section, wherein the sealing member incorporates and seals the electrode connecting portions, the direction changing sections, and one longitudinal end of the hollow insulating body corresponding to the second end of the sensor section;
wherein the power supply members are each formed by a terminal and a lead wire, the terminals are arranged to be adjacent to the second end of the sensor section electrically connected to the electrode wires, and the lead wires are electrically connected to the terminals, and
wherein:
the terminals are plates having a longitudinal direction and a transverse direction, and the terminals are arranged adjacent to the second end of the sensor section such that the transverse direction of the terminals corresponds to the longitudinal direction of the sensor section,
each direction changing section includes the terminal and a bent portion, which is bent such that the direction in which the power supply member extends is changed to a direction toward the other end of the sensor section in the longitudinal direction, and
each bent portion is formed by connecting the distal end of the lead wire that is arranged to intersect the longitudinal direction of the terminal to the terminal.

9. A foreign matter detection sensor comprising:
an elongated sensor section, which includes an elongated elastic hollow insulating body and a plurality of electrode wires arranged inside the hollow insulating body to be separate from each other, wherein the sensor section includes a first end and a second end in a longitudinal direction, and the sensor section detects foreign matter by receiving external force from the foreign matter and being elastically deformed;
power supply members, which are electrically connected to the electrode wires drawn out from the hollow insulating body at the second end of the sensor section via electrode connecting portions, wherein each power supply member includes a direction changing section, which extends from the associated electrode connecting portion in a direction intersecting the longitudinal direction of the sensor section and further extends in a direction toward the first end of the sensor section;
a sealing member, which is provided on the second end of the sensor section, wherein the sealing member incorporates and seals the electrode connecting portions, the direction changing sections, and one longitudinal end of the hollow insulating body corresponding to the second end of the sensor section;
a plurality of element connecting terminals arranged to be adjacent to the first end of the sensor section, the element connecting terminals electrically connect the electrode wires to a resistive element; and
an element-side sealing member, which seals the element connecting terminals, the resistive element, element connecting portions, which connect the element connecting terminals to the resistive element, element-side electrode connecting portions, which connect the element connecting terminals to the electrode wires, and a longitudinal end of the hollow insulating body adjacent to the element connecting terminals,
wherein:
the element connecting terminals are plates having a transverse direction and a longitudinal direction, and are arranged such that the transverse direction of the element connecting terminals corresponds to the longitudinal direction of the sensor section,
the resistive element is arranged at a position closer to the sensor section than one of the ends of each element connecting terminal in the transverse direction opposite to the sensor section, and
the element connecting portions are displaced relative to the element electrode connecting portions in a direction orthogonal to the longitudinal direction of the sensor section on the element connecting terminals.

* * * * *